US005761740A

United States Patent [19]
Johnson et al.

[11] Patent Number: 5,761,740
[45] Date of Patent: Jun. 2, 1998

[54] METHOD OF AND APPARATUS FOR RAPIDLY LOADING ADDRESSING REGISTERS

[75] Inventors: David C. Johnson, Roseville; Lawrence R. Fontaine, Minneapolis; John S. Kuslak, Blaine, all of Minn.

[73] Assignee: Unisys Corporation, Blue Bell, Pa.

[21] Appl. No.: 566,116

[22] Filed: Nov. 30, 1995

[51] Int. Cl.[6] .................................. G06F 9/26; G06F 12/06
[52] U.S. Cl. .............................. 711/202; 711/203; 711/3; 711/113; 711/220
[58] Field of Search ....................... 395/410, 411, 395/375, 445, 412, 484, 496; 711/202, 203, 113, 3, 220

[56] References Cited

U.S. PATENT DOCUMENTS

| | | | |
|---|---|---|---|
| 3,389,380 | 6/1968 | Ashbaugh et al. | 340/172.5 |
| 3,461,433 | 8/1969 | Emerson . | |
| 4,096,568 | 6/1978 | Bennett et al. | 395/416 |
| 4,297,743 | 10/1981 | Appell et al. | 395/650 |
| 4,349,871 | 9/1982 | Lary | 395/800 |
| 4,355,355 | 10/1982 | Butwell et al. | 395/418 |
| 4,521,846 | 6/1985 | Scalzi et al. | 395/407 |
| 4,807,110 | 2/1989 | Pomerene et al. | 395/421.03 |

(List continued on next page.)

OTHER PUBLICATIONS

Harman, "The Motorola MC68000 Microprocessor Family: Assembly Language, Interface Design, and System Design", 1985, pp. 161–167.

Krick et al., "The Evolution of Instruction Sequencing", IEEE, Apr. 1991, pp. 5–15.

Hartley, "Compile–Time Program Restructuring in Multi-programmed Virtual Memory", IEEE, 1988, pp. 1640–1644.

William H. Murray, III and Chris H. Pappas, "80386–80286 Assembly Language Programming", Osborne Mcgraw-Hill, Berkeley, California, 1986, pp. 96–106.

*Primary Examiner*—Eddie P. Chan
*Assistant Examiner*—Than V. Nguyen
*Attorney, Agent, or Firm*—Nawrocki, Rooney & Sivertson, P.A.

[57] ABSTRACT

A method of and apparatus for rapidly modifying the user base registers of an instruction processor. In accordance with the present invention, a load base register user instruction may request an operand from a cache memory, wherein the requested operand may provide a new L field and a new bank descriptor index field. An unconditional compare may be made between the new L,BDI fields and the prior L,BDI fields, regardless of whether the requested operand providing the new L,BDI fields actually resides in a corresponding operand cache. In parallel therewith, the operand cache may determine whether or not the requested operand that provided the new L,BDI fields actually resides in the cache memory. A selector block may then determine if the new L,BDI fields match the previous L,BDI fields, and if the requested operand that provided the new L,BDI fields actually resides in the cache memory. If so, a fast load base register algorithm may be used to load the base register. If not, a slow load base register algorithm may be used.

23 Claims, 17 Drawing Sheets

U.S. PATENT DOCUMENTS

| | | | |
|---|---|---|---|
| 4,825,358 | 4/1989 | Letwin | 395/700 |
| 4,825,363 | 4/1989 | Baumann et al. | 395/375 |
| 4,827,400 | 5/1989 | Dunwell et al. | 395/418 |
| 4,827,406 | 5/1989 | Bischoff et al. | 395/480 |
| 4,835,677 | 5/1989 | Sato et al. | 395/700 |
| 4,841,436 | 6/1989 | Asano et al. | 395/250 |
| 4,843,542 | 6/1989 | Dashiell et al. | 395/446 |
| 4,853,849 | 8/1989 | Bain, Jr. et al. | 395/412 |
| 4,862,349 | 8/1989 | Foreman et al. | 395/700 |
| 4,890,221 | 12/1989 | Gage | 395/775 |
| 4,903,196 | 2/1990 | Pomerene et al. | 395/375 |
| 4,926,316 | 5/1990 | Baker et al. | 395/402 |
| 4,939,640 | 7/1990 | Bachman et al. | 395/375 |
| 4,979,098 | 12/1990 | Baum et al. | 395/418 |
| 5,125,087 | 6/1992 | Randell | 395/375 |
| 5,144,551 | 9/1992 | Cepulis | 395/490 |
| 5,155,834 | 10/1992 | Ryan et al. | 395/415 |
| 5,210,840 | 5/1993 | Fukagawa et al. | 395/421.1 |
| 5,212,778 | 5/1993 | Dally et al. | 395/421.08 |
| 5,226,166 | 7/1993 | Ishida et al. | 395/800 |
| 5,241,635 | 8/1993 | Papadopoulos et al. | 395/375 |
| 5,379,392 | 1/1995 | Alferness et al. | 395/405 |
| 5,414,821 | 5/1995 | Nguyen et al. | 395/375 |
| 5,423,019 | 6/1995 | Lin | 395/411 |
| 5,490,265 | 2/1996 | Riches et al. | 395/496 |
| 5,522,056 | 5/1996 | Watanabe et al. | 395/455 |
| 5,598,551 | 1/1997 | Bajaras et al. | 395/484 |

| | | |
|---|---|---|
| B1  $L_1$ | $BDI_1$ | $OFFSET_1$ |
| B2  $L_2$ | $BDI_2$ | $OFFSET_2$ |
| B3  $L_3$ | $BDI_3$ | $OFFSET_3$ |
| B4  $L_4$ | $BDI_4$ | $OFFSET_4$ |
| B5  $L_5$ | $BDI_5$ | $OFFSET_5$ |
| B6  $L_6$ | $BDI_6$ | $OFFSET_6$ |
| B7  $L_7$ | $BDI_7$ | $OFFSET_7$ |
| B8  $L_8$ | $BDI_8$ | $OFFSET_8$ |
| B9  $L_9$ | $BDI_9$ | $OFFSET_9$ |
| B10 $L_{10}$ | $BDI_{10}$ | $OFFSET_{10}$ |
| B11 $L_{11}$ | $BDI_{11}$ | $OFFSET_{11}$ |
| B12 $L_{12}$ | $BDI_{12}$ | $OFFSET_{12}$ |
| B13 $L_{13}$ | $BDI_{13}$ | $OFFSET_{13}$ |
| B14 $L_{14}$ | $BDI_{14}$ | $OFFSET_{14}$ |
| B15 $L_{15}$ | $BDI_{15}$ | $OFFSET_{15}$ |

METHOD OF AND APPARATUS FOR RAPIDLY LOADING ADDRESSING REGISTERS

CROSS REFERENCE TO CO-PENDING APPLICATIONS

The present application is related to U.S. patent application Ser. No. 08/288,651, entitled "Cooperative Hardware and Microcode Control System for Pipelined Instruction Execution", which is a continuation of U.S. patent application Ser. No. 07/762,282, and U.S. patent application Ser. No. 07/762,276, entitled "Data Coherency Protocol for Multi-Level Cached High Performance Multiprocessor System", both assigned to the assignee of the present invention and both incorporated herein by reference.

BACKGROUND OF THE INVENTION

1. Field of the Invention

The present invention generally relates to general purpose digital data processing systems and more particularly relates to such systems which execute multiple programs.

2. Description of the Prior Art

It is now common in large scale data processing systems to permit software developers to treat real storage as virtual memory. This is a technique wherein all memory accesses by a specific user program are relative in nature. The major advantage of this approach is that memory management can be efficiently performed by the system at the time of program execution depending upon resource availability and requests from other users. The memory management process appears transparent to the user. The 2200/600 system available from the assignee of the present invention, and incorporated herein by reference, is such a system employing virtual addressing.

U.S. Pat. No. 4,827,406 issued to Bischoff et al. shows one method of handling virtual addressing. It is currently most desirable to structure an architecture in which the software makes address references relative to an addressing environment which can be readily loaded along with the program and can be modified during program operation as necessary. The actual physical memory space must be addressed, of course, using an absolute rather than a relative address. To accomplish this, the virtual (or relative) address is converted to an absolute address using a translation table. A typical translation scheme is shown in U.S. Pat. No. 4,827,400 issued to Dunwell et al.

Further convenience and performance enhancements occur by dividing the virtual address space into fixed length pages and by dividing the real address space into blocks. The system is thus enhanced by providing logical divisions for programming purposes while accessing main memory by a hardware efficient block size. The conversion hardware efficiently performs the required translations without subjecting the user to the resulting bookkeeping. As a result, the storage resources of the system are efficiently managed in real time without unnecessary concern by the users.

The registers which store the data permitting conversion from the virtual address of a software program to the real address used by the physical storage system are assumed to be unique to that software program. The virtual address for a program or operand segment is loaded into an active base table. The corresponding absolute address of the segment is computed and placed into a base register. As different programs are loaded and run, the contents of these registers must be modified. Similarly, the contents of one or more of the registers may need to be modified during the operation of a given program to permit access to different segments of data located at different virtual addresses. U.S. Pat. No. 4,862,349 issued to Foreman et al. shows a technique for user modification of control block data. However, care must be exercised to prevent one program from inadvertently impacting another, unrelated program. U.S. Pat. No. 4,835,677 issued to Sato et al. shows a typical hardware protection approach. Notification to multiple users of a General Purpose Register set is provided by the technique of U.S. Pat. No. 4,903,196 issued to Pomerene et al.

User modification of address-translation tables must be accompanied by modification of addressing limits to maintain data security. Furthermore, it is desirable that the user program be permitted to change the conversion tables using virtual addressing. Unfortunately, complete modification of all of these quantities consumes a substantial amount of processor capacity. However, studies have shown that as many as 85% of the base register modification operations during the execution of a particular user program change only the offset within a bank.

An approach that takes advantage of this is disclosed in U.S. Pat. No. 5,379,392 issued to Alferness et al. Alferness et al. suggest determining whether the generation of a new base register value will use the same bank descriptor table and bank descriptor index as was used for generating the prior bank register value. If so, the difference between the prior contents of the base register and the new contents of the base register will only differ by the offset. For such base register changes, Alferness et al. suggests modifying the offset by using a simple arithmetic operation, without requiring further memory references. A performance enhancement may result by the elimination of the complete absolute address computation in those cases where only the offset is changed.

A common opportunity for changing the data registers which translate virtual to absolute addresses is during interrupts which transition the processor from one state to another, and at the initiation of an application program after the partial or complete run of a different and unrelated application program. The assignee of the present invention has for some time provided systems wherein the executive and user states have dedicated registers to mitigate a portion of this problem. A less efficient approach may be found in U.S. Pat. No. 4,825,358 issued to Letwin. U.S. Pat. No. 4,853,849 issued to Bain, Jr. et al. shows an alternative technique for input/output transfers.

Most modern large scale data processing systems also employ some form of microprocessing and pipelining. U.S. Pat. No. 4,825,363 issued to Baumann et al. and U.S. Pat. No. 4,841,436 issued to Asano et al. show microprocessor based architectures. U.S. Pat. No. 4,890,221 issued to Gage and U.S. Pat. No. 4,939,640 issued to Bachman et al. show architectures wherein the environment is saved by storing all of the variables.

SUMMARY OF THE INVENTION

The present invention provides an improvement over the prior art by providing a method of and apparatus for rapidly modifying the base registers of an instruction processor. In accordance with the present invention, a load base register user instruction or a load base register executive instruction may request an operand from a cache memory, wherein the requested operand may provide a new level (L) field and a new bank descriptor index (BDI) field. An unconditional compare may be made between the new L,BDI fields and the prior L.BDI fields, regardless of whether the requested operand providing the new L.BDI actually resides in a corresponding operand cache. In parallel therewith, the operand cache may determine whether or not the requested operand that provided the new L.BDI fields actually resides in the cache memory. A selector block may then determine if the new L.BDI fields match the previous L.BDI fields, and if the requested operand that provided the new L.BDI fields actually resides in the cache memory. If so, a fast load base register algorithm may be used to load the corresponding base register. If not, a slow load base register algorithm may be used. This approach may improve the parallel nature of a base register load and may reduce the number of signal traces extending between logic elements.

In accordance with the present invention, it is contemplated that the cache memory may include a data portion and a cache tags portion. The data portion may provide the requested operand while the cache tags portion may determine if the requested operand validly resides in the cache memory. The cache data portion may be physically located on a first substrate and the cache tags portion may be physically located on a second substrate. The second substrate may further include instruction control logic for the instruction processor of the data processing system. Partitioning the system in this manner may minimize the number of signals that must be routed between substrates, thereby enhancing the performance of the system. It is expected that the present invention may increase overall system performance by as much as 4–5%.

Though the preferred mode is associated with rapid loading of a base register address by a user application or executive program, the technique is applicable to various other environmental changes depending upon the machine architecture.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 8 shows the format of the active base table;

DETAILED DESCRIPTION OF THE PREFERRED EMBODIMENTS

Figure 1:
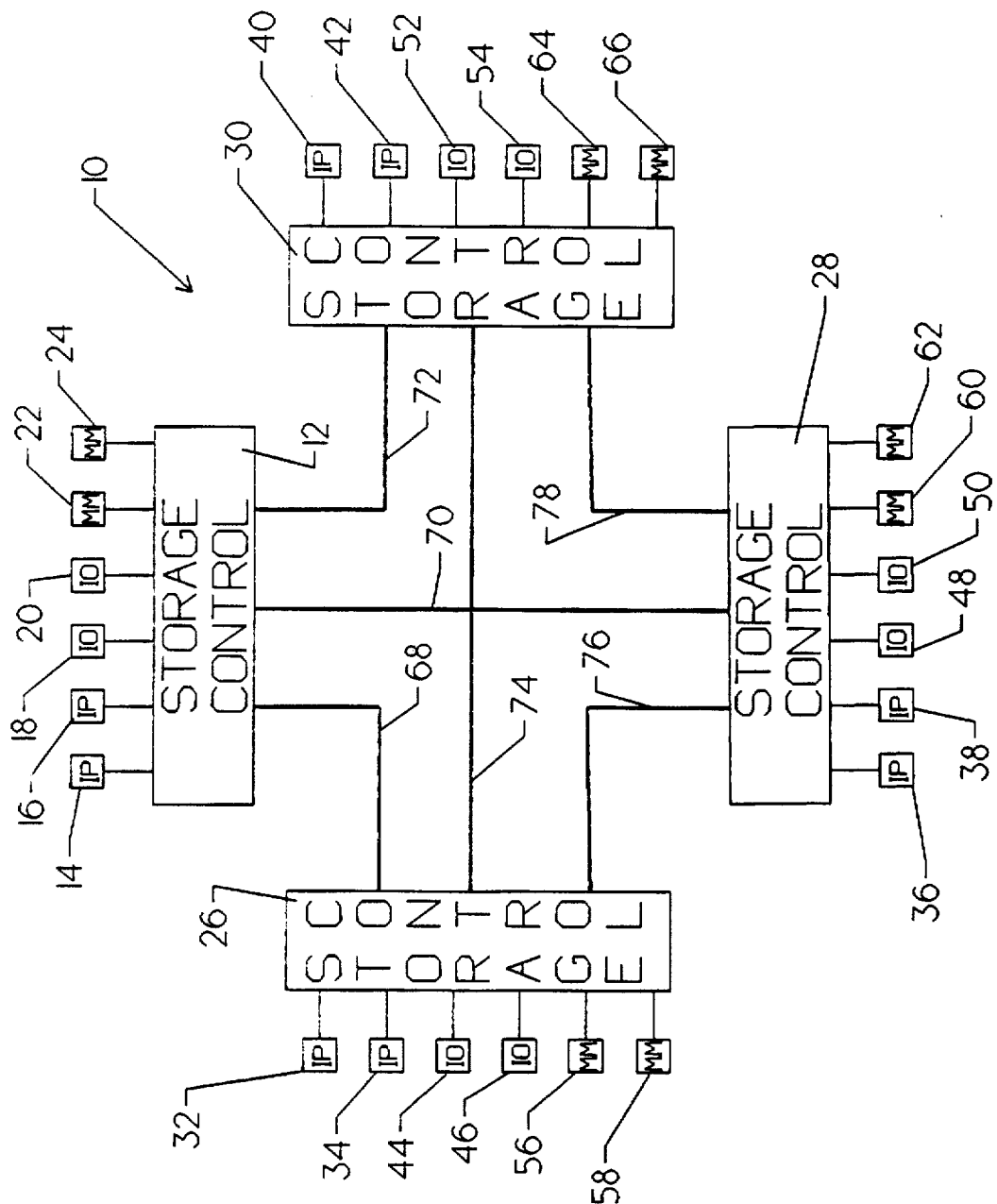
FIG. 1 is a schematic diagram of a fully populated data processing system incorporating the present invention.

FIG. 1 is an overall diagram of fully populated data processing system 10 according to the present invention. Data processing system 10 includes four individual processing clusters, each having its own storage controller and each having point-to-point communication with the other clusters via a storage controller to storage controller interface.

Storage controller 12 is coupled to storage controller 26 via interface 68. Similarly, storage controller 12 is coupled to storage controller 28 via interface 70 and to storage controller 30 via interface 72. Storage controller 26 communicates with storage controller 28 via interface 76 and to storage controller 30 via interface 74. In similar fashion, storage controller 28 and storage controller 30 are coupled via interface 78.

Storage controller 12 is fully populated with instruction processor 14, instruction processor 16, input/output processor 18, input/output processor 20, main memory module 22 and main memory module 24. Each of instruction processors 14 and 16 (along with similar instruction processors 32, 34, 36, 38, 40, and 42) has internal dedicated cache resources in the form of an instruction cache and an operand cache. These elements, along with the associated data invalidity logic, are described in more detail below. A more general description of the construction and operation of instruction processors 14 and 16 may be found in the above referenced and commonly assigned copending U.S. Patent Application which has been incorporated by reference.

Input/output processors 18 and 20, along with main memory modules 22 and 24, may be elements currently available, such as found in the Unisys Model 2200/600 series. Input/output processors 44, 46, 48, 50, 52, and 54 and main memory modules 56, 58, 60, 62, 64, and 66 may be similarly found.

Figure 2:
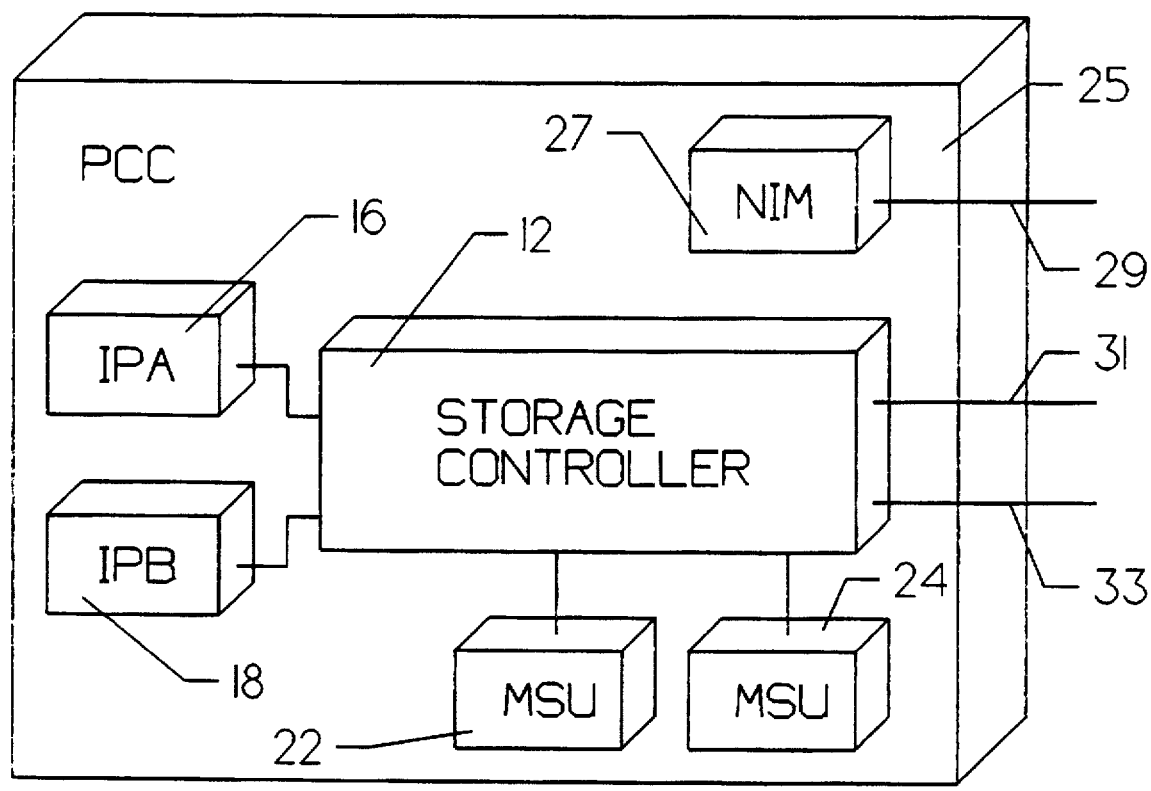
FIG. 2 is a pictorial diagram showing the packaging arrangement of the data processing system of FIG. 1.

FIG. 2 is a schematic diagram showing the packaging of a portion of data processing system 10. A major physical element of data processing system 10 is Processing Complex Cabinet, PCC 25. Within fully populated PCC 25 is located instruction processors 16 and 18 (i.e. IPA and IPB). In the preferred mode, each of these instruction processors is packaged on a single high density circuit board. The memory storage units 22 and 24 are coupled to storage controller 12 as explained above.

Network interface module (i.e. NIM) 27 provide an interface to the operator console via cable 29. Cables 31 and 33 couple input/output units 18 and 20 (see also FIG. 1) to storage controller 12. Input/output units 18 and 20 are physically packaged in an Input/output Complex Cabinet (i.e. ICC) which is not shown for clarity. Other referenced elements are as previously described.

Figure 3:
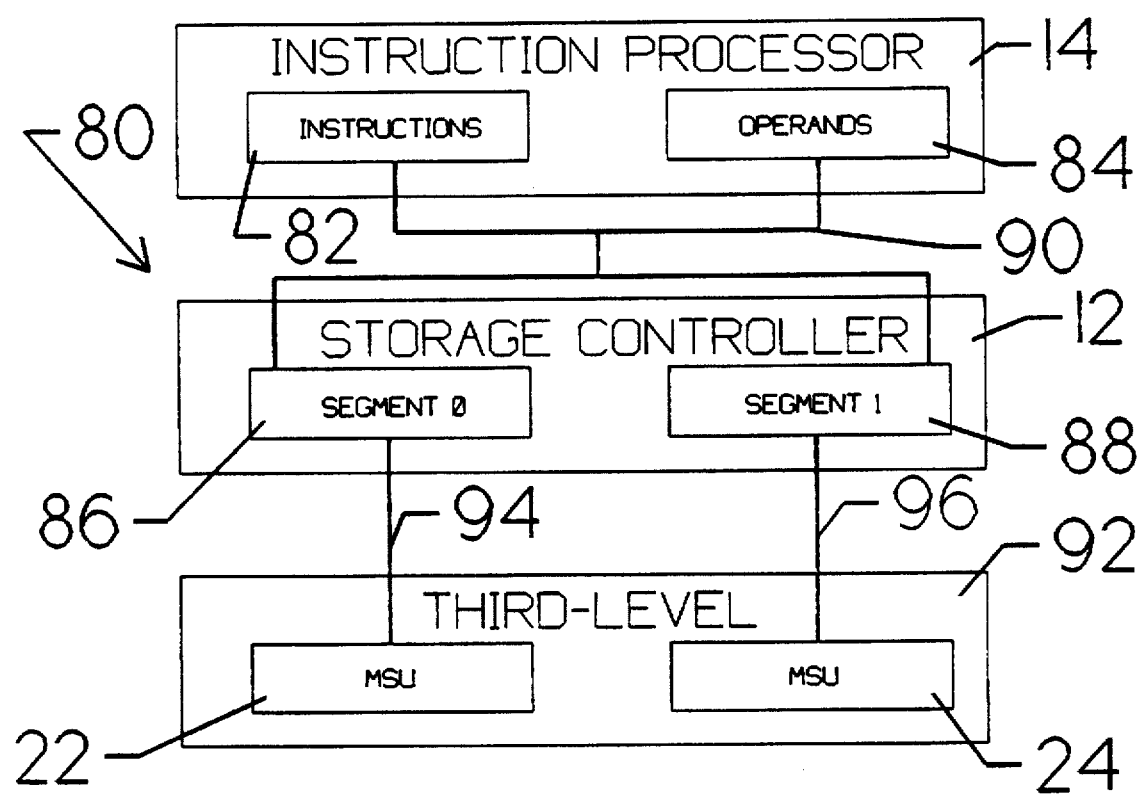
FIG. 3 is a schematic diagram of the levels of storage for a single instruction processor.

FIG. 3 is a flow diagram 80 showing the hierarchical arrangement of the three levels of storage within data processing system 10. Instruction processor 14 contains an instruction cache 82 and an operand cache 84, each storing 8k of 36 bit words. These are internal to instruction processor 14 and dedicated to the operations undertaken therein. By partitioning the internal dedicated cache resources in this manner, there is a certain concurrence of cache accesses associated with normal instruction execution.

Upon the request of instruction processor 14 to access a particular data element as either an instruction or operand, the directory of instruction cache 82 or operand cache 84, respectively, is queried to determine if the required data element is present within the associated cache resource. If the data element is present and valid, the access is completed at that level. If not, access is made to storage controller 12 via interface 90 for the block of eight 36 bit words containing the desired data element. A more detailed explanation of the operation of instruction cache 82 and operand cache 84 is found below.

Storage controller 12 contains an intermediate level cache segment of 128k 36 bit words for each for each main memory module within the cluster. In the present illustration, storage controller 12 contains segment 0 cache 86 and segment 1 cache 88. These cache resources are shared by all users of the main memory within the cluster to include both local and remote users. Any memory request to storage controller 12 is routed to the appropriate directory of segment 0 cache 86 or segment 1 cache 88 to determine if the desired data element is present and valid. This routing is based upon the address requested, since the intermediate cache resources are partitioned in address space to correspond to the associated main memory module.

If present and valid, the requested data element is supplied as an eight word block. If the requested data element is not validly present in segment 0 cache 86 or segment 1 cache 88 (depending upon the requested address), the data is requested from third level storage 92 containing main memory modules 22 and 24 via interfaces 94 and 96, respectively. In the preferred mode, main memory modules 22 and 24 each contain 64 meg. words of storage.

Each data element request to storage controller 12 is made through a separate interface. For a fully populated system, this includes two instruction processors, two input/output processors, and three other storage controllers (see also FIG. 1). Each data element request is divided between segment 0 cache 86 and segment 1 cache 88 based upon requested address. Only if the requested data element is not validly present in the appropriate intermediate level cache resource is an access request made to third level 92.

Figure 4:
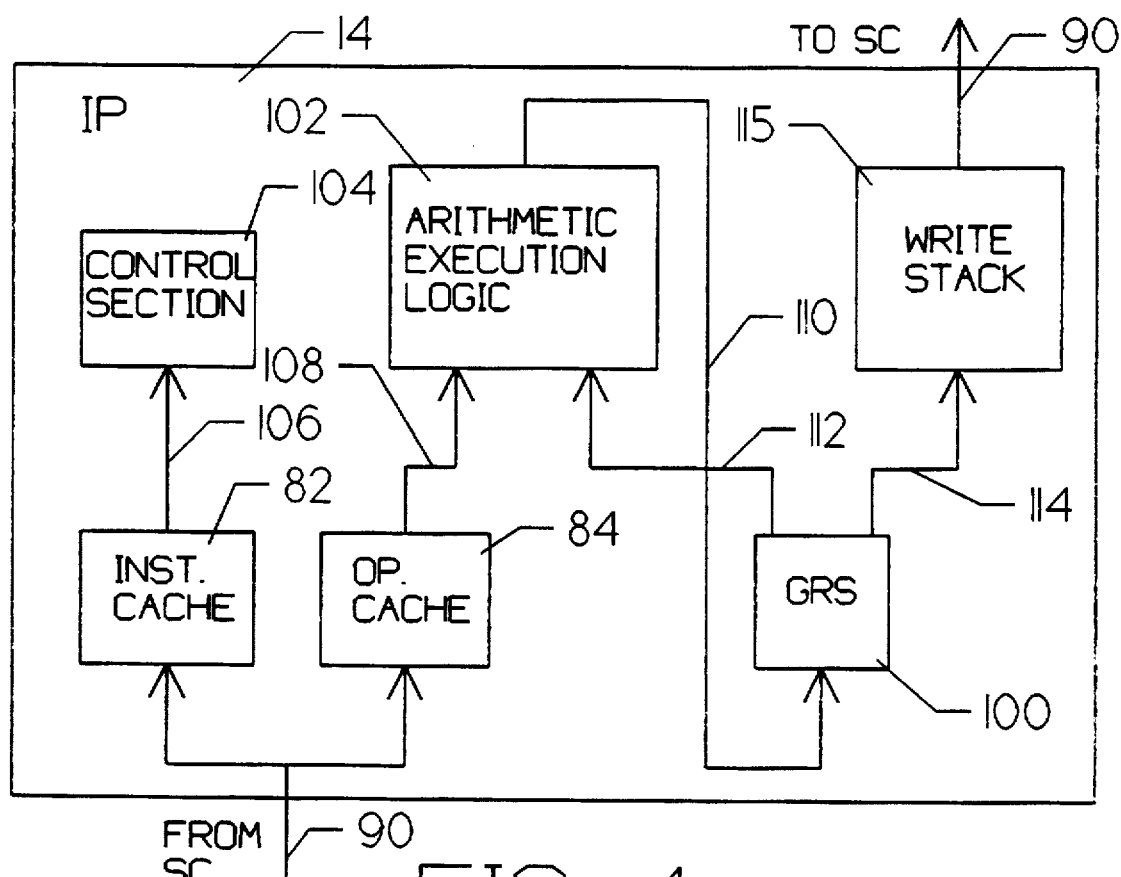
FIG. 4 is a simplified block diagram showing the major elements of the instruction processor.

FIG. 4 is a simplified block diagram of instruction processor 14 showing the major data and control paths. Cable 90, providing the data transfer path between storage controller 12 and instruction processor 14, is actually a two-way path. Data is accessed by storage controller 12 and routed to either instruction cache 82 or operand cache 84 depending upon whether the initial request was for instruction data or operand data. In accordance with usual local cache operation, instruction cache 82 and operand cache 84 temporarily store the data for use by instruction processor 14. Cable 90 also couples write data from write stack 115 to storage controller 12 for longer term storage. Priority for this shared interface is ordinarily given to read data requests requiring write data to be queued in write stack 115. The exception to giving priority to read data is whenever data is to be read from a location for which a write access has been queued.

Instructions from instruction cache 82 are provided via path 106 to control section 104 for decoding via microcode controller and hardwired control logic. This is discussed in greater depth below. Arithmetic execution logic 102 receives operand data via path 108 and performs the specified operation using a combination of microcode controller and hardwired control as explained in greater detail below.

Most arithmetic instructions operate upon data which is temporarily stored in general register stack 100. This permits most rapid access to the data, because that data is directly accessed from an extremely fast storage stack. Similarly, arithmetic results are often returned to general register stack 100 for temporary storage until further arithmetic processing. Data is routed to general register stack 100 by path 110. Data from general register stack 100 is routed back to arithmetic execution logic 102 via path 112 and to write stack 115 via path 114. The data transferred to write stack 115 is queued for storage by storage controller 12 as discussed above.

Figure 5:
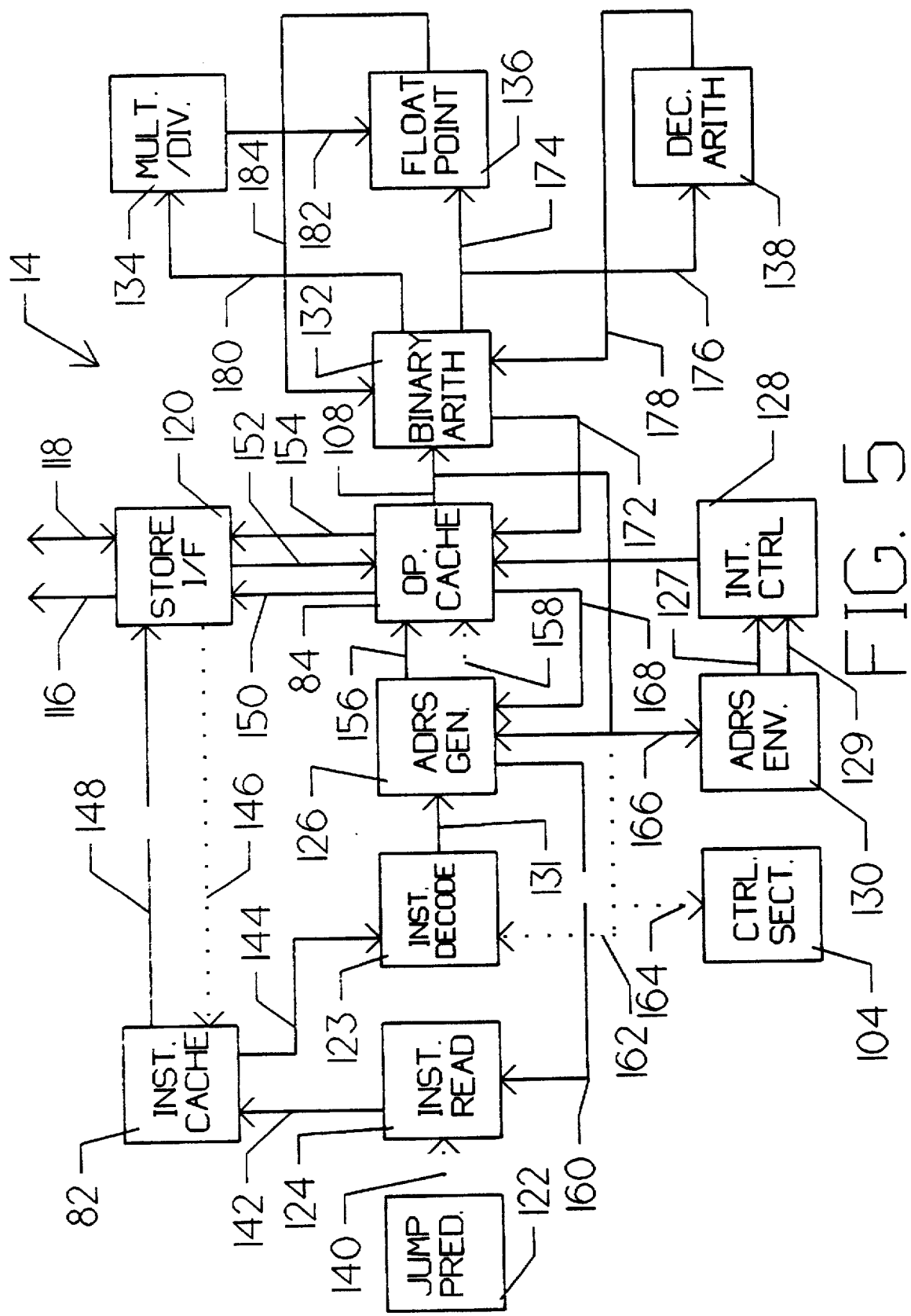
FIG. 5 is a detailed block diagram of the instruction processor.

FIG. 5 is a more detailed block diagram of instruction processor 14. The major data paths are shown, with the solid line paths signifying 72 bit, double word, transfer paths; the dashed line paths signifying addressing paths; and the dotted lines indicating data paths of no greater the 36 bits. Control line paths are not shown for clarity.

The interface to storage controller 12 is via cable 90, as described above. It consists of write cable 116 and read/write cable 118. Each of these data paths couples a 72 bit double word in parallel fashion. The function of write stack 115 (see also FIG. 4) is incorporated within store interface 120 which also provides the request/acknowledge synchronization logic. Addressing information for store interface 120 is sent from instruction cache 82 via cable 148 and operand cache 84 via cable 150 for a corresponding cache miss. Instructions are sent to instruction cache 82 via path 146. Because instructions are 36 bit words, path 146 has a width of 36 bits. Operand data read by storage controller 12 is transferred from store interface 120 to operand cache 84 by path 152. Similarly, write operand data is sent from operand cache 84 to store interface 120 via path 154. Both path 152 and path 154 have a width of 72 bits to accommodate double word operands.

Instructions to be executed are addressed by instruction read 124. The addresses are computed using one of the base registers located within address environment 130 as explained in more detail below. If the instruction is the next sequential instruction, its address is determined by incrementing the program address counter. If the instruction to be executed is addressed by a branch or jump instruction, the address is computed by address generator 126 and supplied via path 160. Alternatively, the address is supplied by jump prediction 122 via path 140 during operation in the jump prediction mode. The address of the next instruction is provided to instruction cache 82 via path 142.

The next addressed instruction is fetched from instruction cache 82 if a match is found. If the request results in a cache miss, storage controller 12 is requested to read the memory block containing the instruction as discussed above. In either case, the instruction is provided to instruction decoder 123 via path 144. The instruction is decoded through the use of a microcode controller by instruction decode 123, and the operand address is computed by address generator 126 from the data received via path 131.

Operand cache 84 contains general register stack 100 (see also FIG. 4). The cache is addressed by the output of address generator 126 received from path 158. Direct operands are received on path 156. If a match is not made in operand cache 84, a read request is made of storage controller 12 through store interface 120 as explained above. If a match is found in operand cache 84 or if the instruction specifies a direct operand received on path 156, the operand data is more immediately produced. In either case, the operand data is routed in accordance with the operation to be performed as specified by the instruction. Indirect operands cause the new operand address to be transferred to address generator 126 via path 168. Operands are transferred to binary arithmetic 132 for mathematical computation via path 108 or to address environment 130 via path 166.

Binary arithmetic 132 provides the basic control for all arithmetic operations to be performed on data received via path 108. Floating point operations are scaled and controlled by floating point logic 136 which receives operand data on path 174. Floating point results are returned to binary arithmetic 132 by path 184. Mult./div. 134 performs the basic multiplication and division operations for fixed point instructions. Operand data is received via path 180 and the products/quotients returned via path 182 and floating point logic 136. Decimal arithmetic 138 receives operand data on path 176 and returns results via path 178. Decimal arithmetic performs special purpose decimal operations.

Another category of instructions, and those of most concern to the preferred mode of the present invention, involves a change to the base registers within addressing environment 130. The data is supplied to addressing environment 130 via path 166. The updated base register contents are provided to address generator 126 via interface 166. Base register contents are supplied to interrupt control 128 via paths 127 and 129. Interrupt control 128 provides the interrupt data to operand cache 84 via path 170. Control section 104 provides the overall microcode control.

The operation of instruction processor 14 is intended to occur in the pipelined mode whenever feasible. A more detailed description of the timing of this pipelined operation may be found in the above referenced co-pending application, entitled "Data Coherency Protocol for Multi-Level Cached High Performance Multiprocessor System", which has been incorporated herein by reference. The remaining referenced components are as previously discussed.

Figure 6:
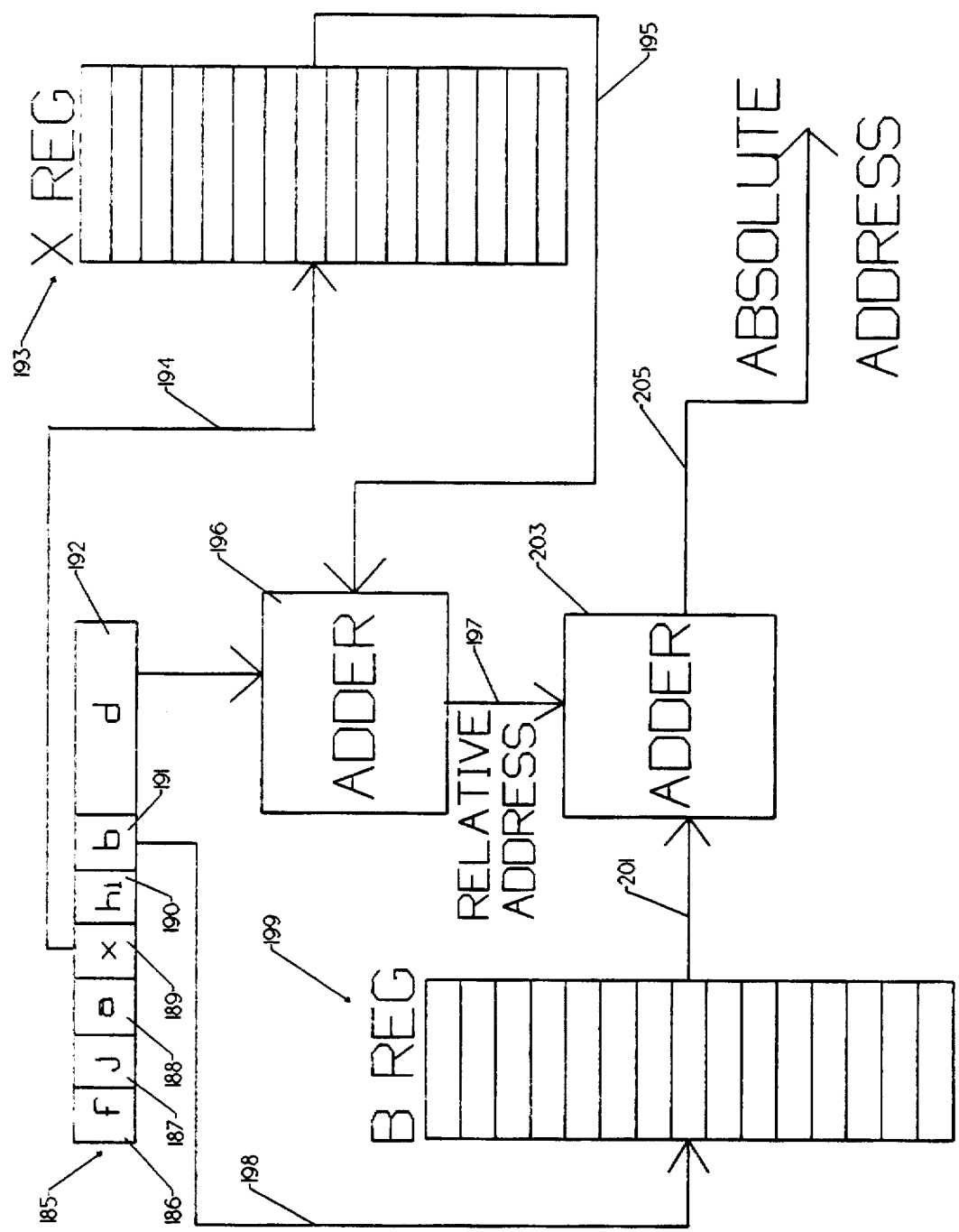
FIG. 6 shows the generation of an absolute operand address for an extended mode instruction.

FIG. 6 is a schematic diagram showing the formation of an absolute operand address. Instruction 185 is a 36 bit word containing an extended mode instruction. Function code 186 specifies the operation to be performed. J field 187 provides for interpretation of the operand. The use of a particular index register is designated by x field 189. Hi field 190 provides operand mode control, and may be used as an extension of the B field 191 in certain operand modes. B field 191 is a four bit field, which in the extended mode, identifies one of the 15 user base registers. An operand displacement is provided by d field 192. A more detailed explanation of the instruction format may be obtained from the above referenced, commonly assigned, co-pending U.S. Patent Application, entitled "Data Coherency Protocol for Multi-Level Cached High Performance Multiprocessor System".

One of the 15 locations of base register stack 199 is selected by the contents of b field 191 supplied by cable 198. The format for the contents of base register stack 199 is explained in more detail below. The address read from the selected base register location is provided to adder 203 via cable 201 wherein it is added to the relative address received from adder 196 via cable 197. The output of adder 203 is an absolute address provided on cable 205

The x field 189 is a four bit quantity used to select one of the 16 index registers of index register stack 193 via cable 194. The contents of the selected index register is an address index which is supplied to adder 196 via cable 195. Adder 196 adds the address index to the displacement received from d field 192. The sum is a relative address which is provided to adder 196 via cable 197.

Figure 7:
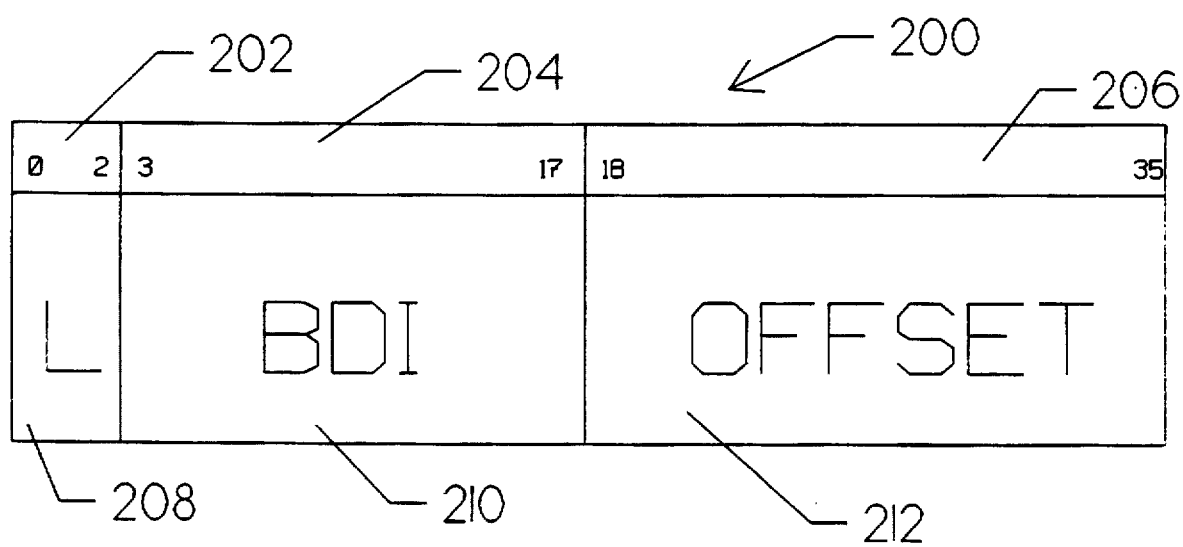
FIG. 7 shows the format of a virtual address.

FIG. 7 shows the format 200 of a virtual address. As explained above, the virtual address may be used by both application programs and the executive program to specify the location of a data segment. To permit execution of the corresponding program, this virtual address must be converted to an absolute address for reference to a physical storage location. However, great flexibility is provided by permitting the programs to define the data segment using this virtual address.

In a preferred embodiment, the virtual address format 200 has a width of 36 bits which are divided into three separate fields. Field 202, consisting of the three least significant bit positions 0–2, contains variable 208, designated as level or "L". This variable is a control character which selects one of the eight bank descriptor tables.

Bit positions 3–17 are partitioned as field 204. This 15 bit field is used to store variable "BDI", the Bank Descriptor Index field. The BDI provides an index to the bank descriptor table selected by L variable 208. This index uniquely defines one of the bank descriptors within the selected bank descriptor table. An absolute address is computed using the contents of the selected bank descriptor uniquely identified by the virtual address (e.g. the L.BDI fields).

The most significant half of the virtual address (i.e. bit positions 18–35) define field 206 which is used to store offset 212. This variable is added to the base address contents of the uniquely identified bank descriptor to produce the data to be loaded into the base register address field being referenced.

FIG. 8 shows active base table 214 comprising the entire set of 15 virtual addresses which define the contents of the base register address field of the user base registers. This set of virtual addresses corresponds to base registers B1, B2, ..., and B15. Loaded into the active base table are entries 216, 218, ..., and 244, respectively. Each of these entries is as defined in FIG. 7.

Figure 9:
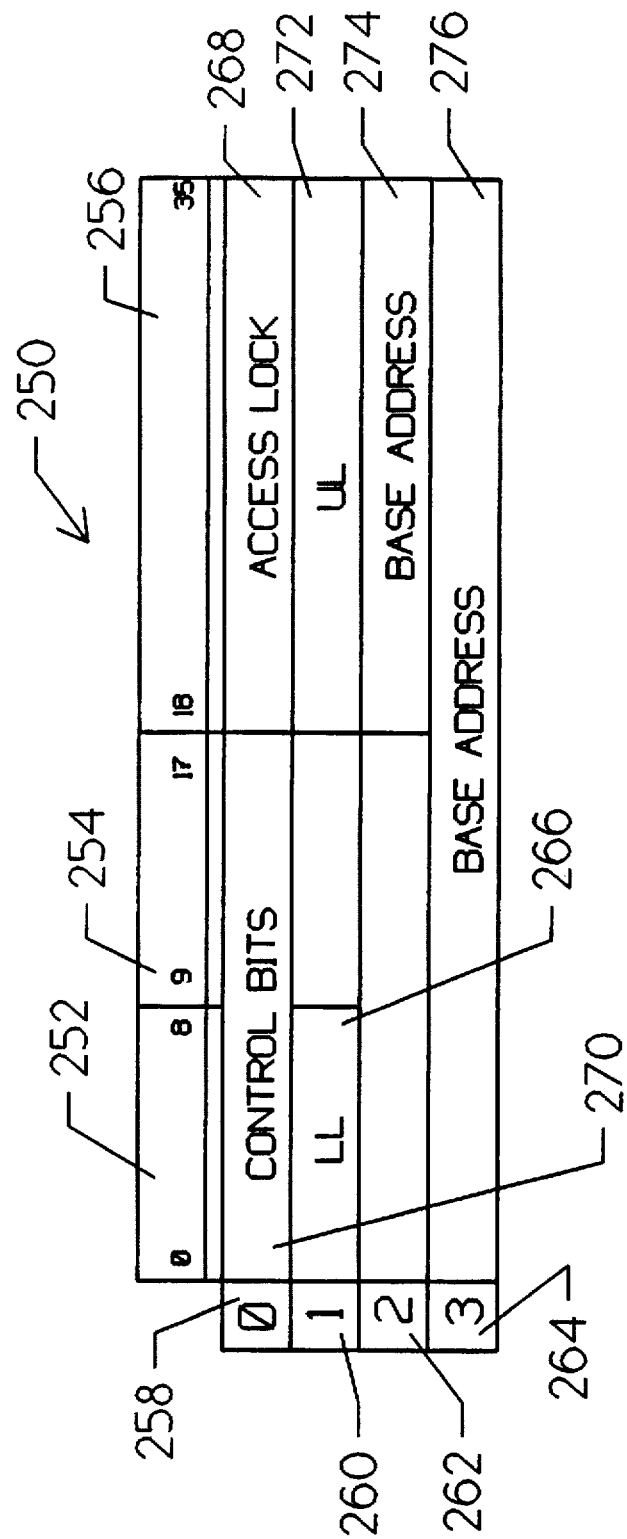
FIG. 9 shows the format of a base register entry.

FIG. 9 shows the format for one entry 250 in one of the 15 user base registers. Each entry consists of four 36 bit words (i.e. words 258, 260, 262, and 264), wherein each word has lower quarter 252, second quarter 254, and upper half 256. Word 258 has a number of control bits 270 within lower quarter 252 and second quarter 254. Upper half 256 of word 258 contains access lock 268.

Lower limit 266 is located in lower quarter 252 of word 260. Upper limit 272 is located in upper half 256 of word 260. Upper limit 272 and lower limit 266 are used to set the security limits on user program access to the associated data segment.

The base address consists of portion 274 located in upper half 256 of word 262 and portion 276 located in the entire 36 bits of word 264. In this manner, an absolute storage space of $2^{52}$ words of 36 bits each can be uniquely addressed by the absolute address.

Figure 10:
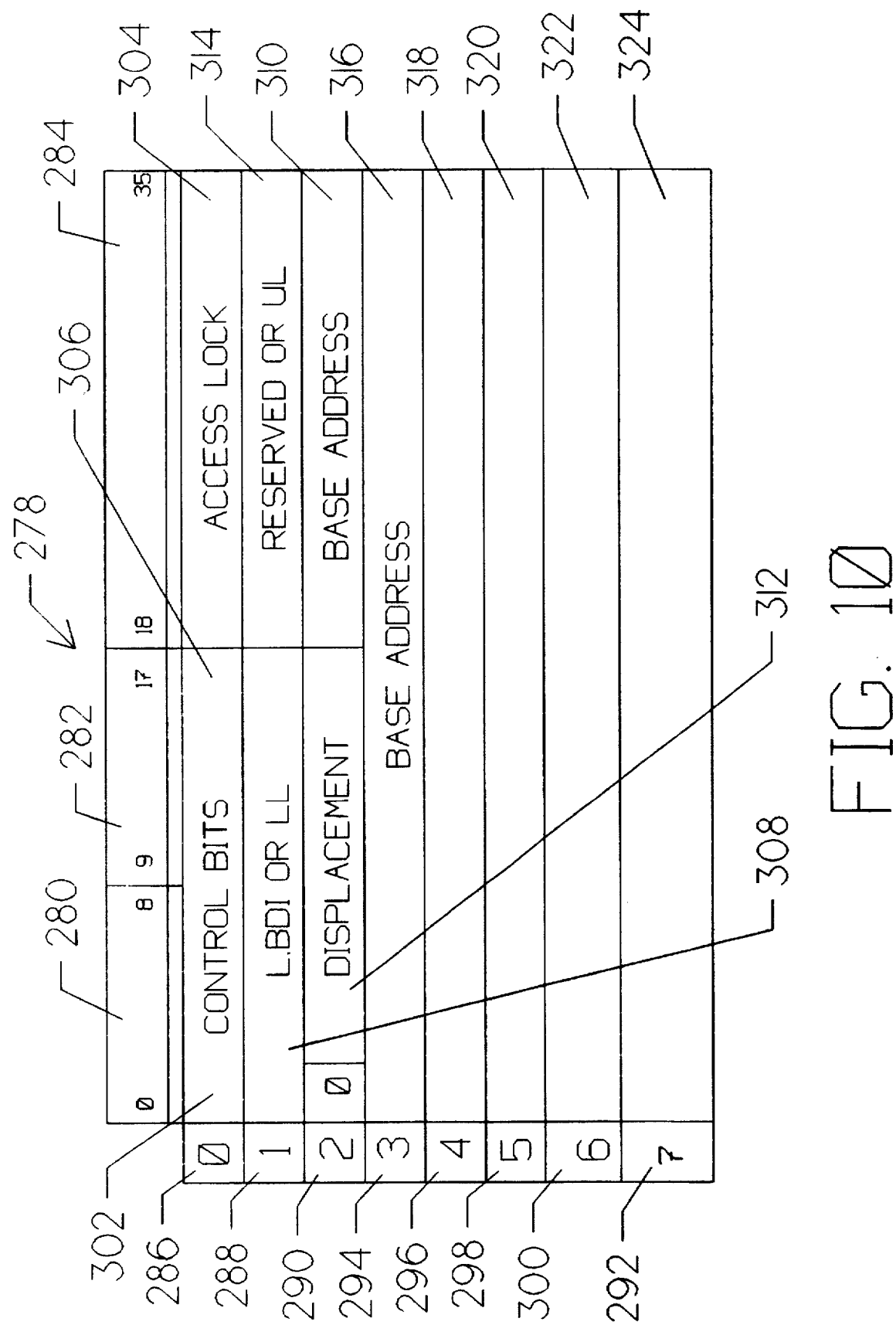
FIG. 10 shows the format of a bank descriptor table entry.

FIG. 10 shows the format 278 for a bank descriptor entry in one of the eight bank descriptor tables. Each bank descriptor table may accommodate up to $2^{15}$ entries (i.e. the maximum number which can be uniquely specified by BDI field 210 of virtual address format 220, see also FIG. 7). A single base descriptor entry consists of eight 36 bit words (i.e. words 286, 288, 290, 294, 296, 298, 300, and 292). Each word consists of lower quarter 280, second quarter 282, and upper half 284.

Control bits 302 are contained in lower quarter 280 and second quarter 282 of word 286. Bits 8–11 of the control bits 302 identify the type of the corresponding bank descriptor. For example, the type field may indicate that the corresponding bank descriptor is in a basic mode, an extended mode, an indirect mode, or other pre-defined mode. Access lock 304 is located within upper half 284 of word 286.

The definition of the lower quarter 280 and second quarter 282 of word 288 is dependent on the value specified in bits 8–11 of word 286. That is, the L and BDI fields of the virtual address that uniquely identify the particular bank descriptor entry are located in lower quarter 280 and second quarter 282 of word 288, but only if the bank descriptor type as identified by bits 8–11 of word 286 corresponds to an indirect mode. Otherwise, the lower quarter 280 of word 288 includes a lower limit, and the second quarter 282 of word 288 and the upper half 284 of word 288 include an upper limit.

The 52 bit absolute address to be added to the offset of the virtual address consists of portion 310 located within upper half 284 of word 290 and portion 316 which occupies all of word 294. Displacement 312 is located within word 290. User program variables 318, 320, 322, and 324 are stored within words 296, 298, 300, and 292, respectively.

Figure 11:
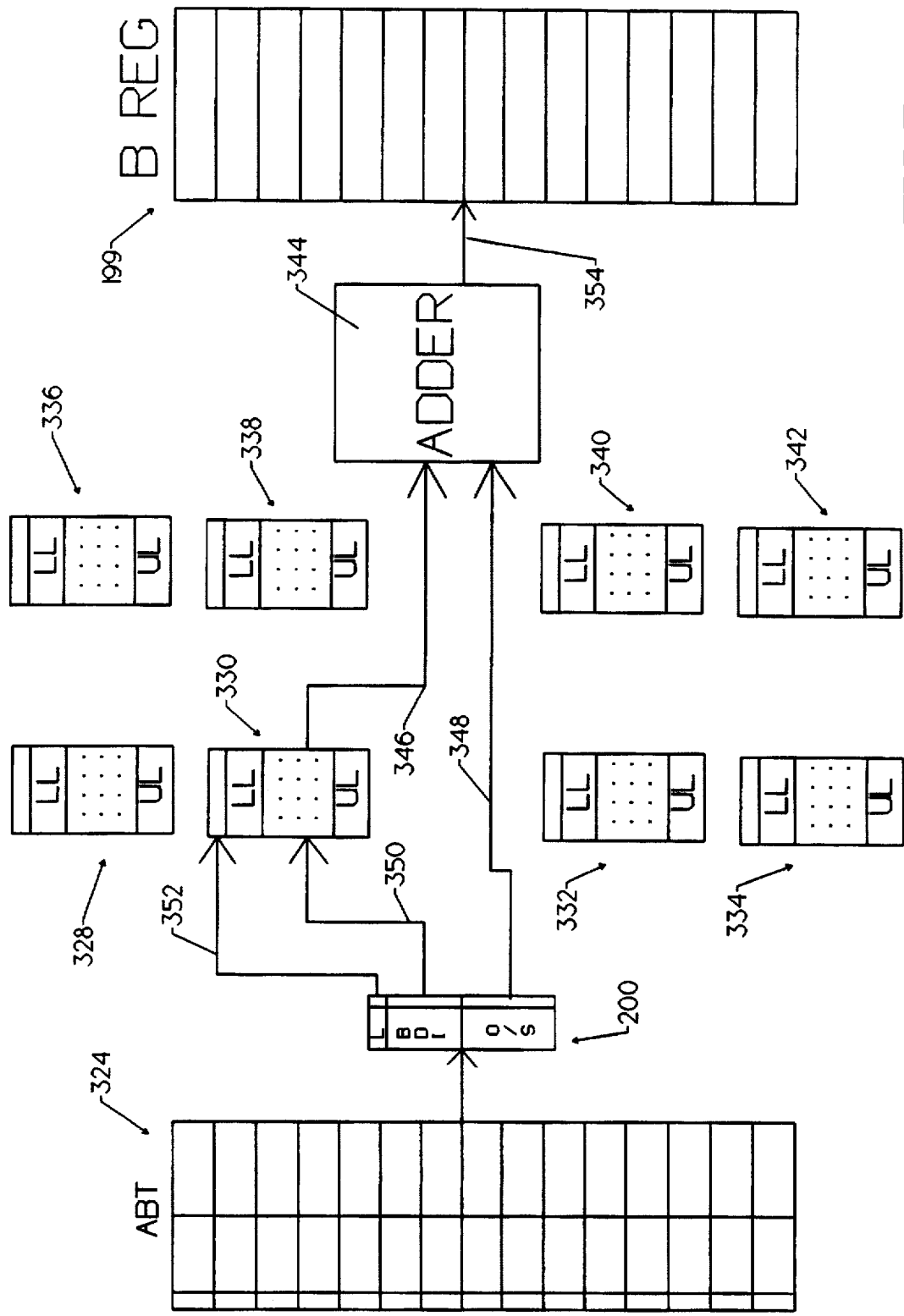
FIG. 11 shows the conversion of a virtual address into an absolute address for loading a base register.

FIG. 11 is a schematic diagram for the general process of loading a base register using a virtual address. To load a base register, a virtual address (see also FIG. 7) is loaded into the corresponding location of active base table 324 (see also FIG. 8). The L field is supplied from virtual address 200 via cable 352 to select one of the eight bank descriptor tables (i.e. bank descriptor tables 328, 330, 332, 334, 336, 338, 340, and 342). In the present example, bank descriptor table 330 is selected.

Of the $2^{15}$ bank descriptor entries (see also FIG. 10) within bank descriptor table 330, one is selected using the bank descriptor index field (i.e. BDI 210) of virtual address 200 transferred via cable 350. As explained above, the selected bank descriptor entry contains lower limits, upper limits and a 52 bit address (see also FIG. 10). The 52 bit address is transferred to adder 344 via cable 346. Offset field 212 of virtual address 200 is transferred to adder 344 via cable 348. The 52 bit sum computed by adder 344 is loaded via cable 354 into the selected base register of base register stack 199.

In general, the selection and access of one of the bank descriptor entries must be made if the previous content of the base register was determined with either a different bank descriptor table or a different bank descriptor entry within the same bank descriptor table. However, when changing a base register entry, if the same base descriptor table and same bank descriptor entry within that table are used, the previous contents and future contents of the base register will differ only by the difference in the previous and present offset values. Therefore, such a base register change can be accomplished without any need to access the bank descriptor tables. That is, the appropriate base register can be modified using the difference between the offset values. It has been shown in benchmark analyses that up to 85% of the user base register changes made during the execution of the user program change only the offset.

Figure 12:
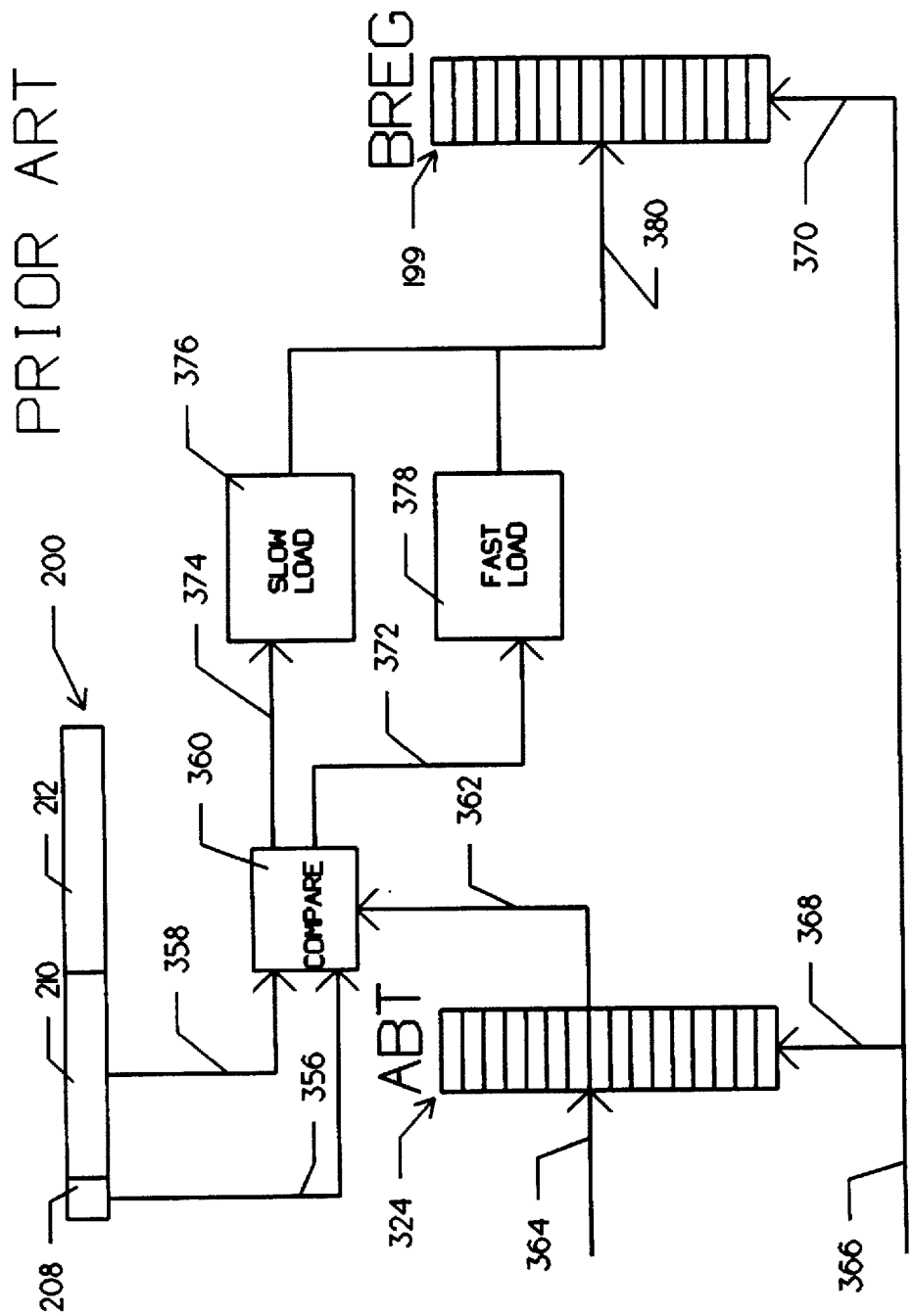
FIG. 12 is a schematic diagram showing how the decision is made to employ the fast or slow base register load in accordance with the prior art.

FIG. 12 is a schematic diagram showing selection of one of the two alternative methods of updating a base register in accordance with the prior art. The virtual address 200 is retrieved using the operand of the load base register user instruction. L field 208 and BDI field 210 are supplied to comparator 360 by cables 356 and 358, respectively. Active base table 324 is accessed using the designation of the base register to be modified supplied via cable 366. As the new virtual address is entered into the appropriate location of active base table 324, the previous contents are supplied to comparator 360 via cable 362. Comparator 360 compares the L and BDI fields of the previous entry with those of the new virtual address 200. If equal, fast load logic 378 is selected via cable 372. If unequal, slow load logic 376 is selected via cable 374.

Fast load logic 378 computes the new value to be stored within the appropriate base register. This value may be conveniently determined in several ways. In a first approach, the bank descriptor (i.e. absolute address for the initial location of the bank) may be saved from the previous loading of the base register. This requires sufficient random access storage to hold the bank descriptor relative to the base register designation to save the time needed to access the corresponding bank descriptor table. That is, the new Offset is added to the previous bank descriptor, with the sum loaded into the base register.

Alternatively, fast load logic 378 subtracts the previous offset from the future offset. This difference is added to the current absolute address of the base register to be modified via cable 380. The base register is selected by cable 370. For either approach, no further memory accesses or computations are required resulting in a substantial performance enhancement.

Slow load logic 376 discards the previous virtual address and performs the loading of the selected base register in accordance with the previous description (see FIG. 11). With either slow load or fast load, the relative limits must be set.

Figure 13:
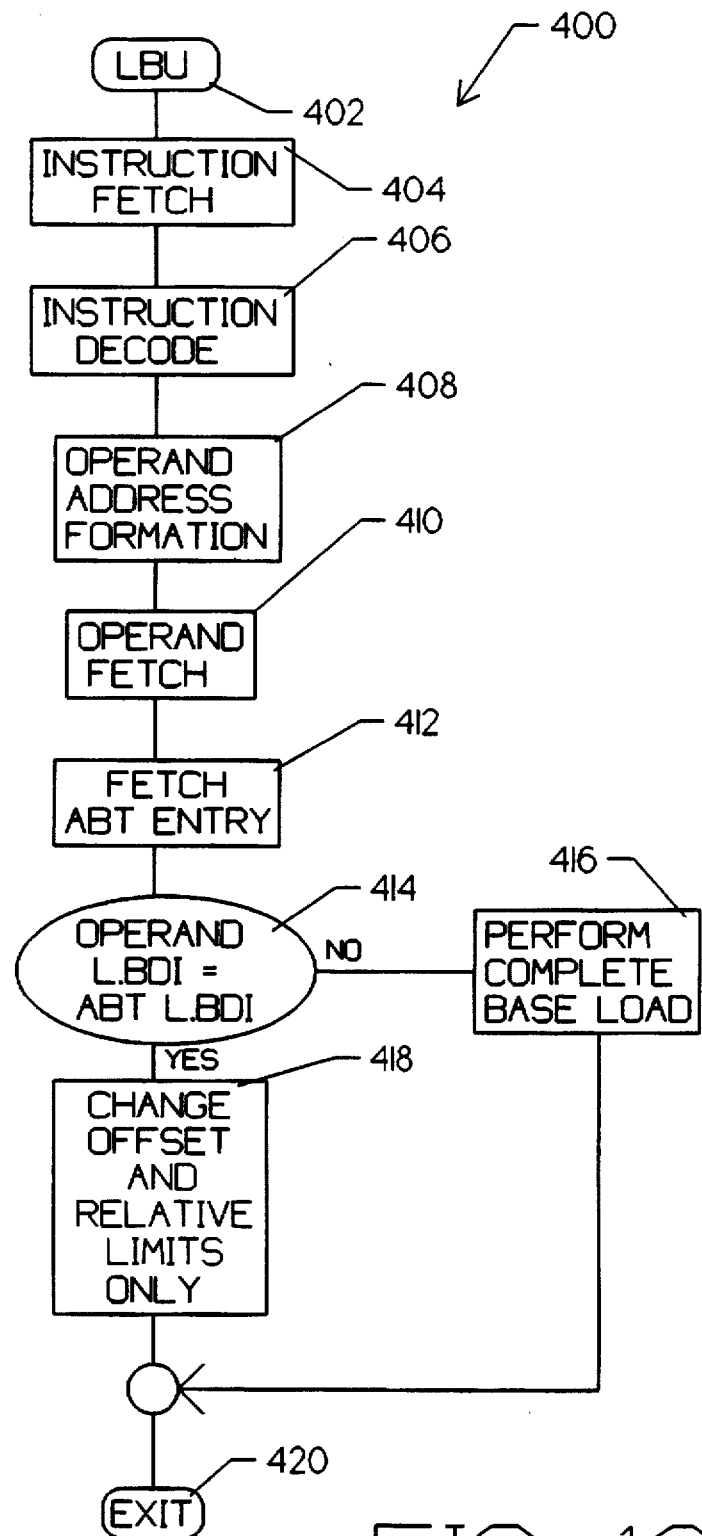
FIG. 13 is a flow chart showing the logical operation of a load base register instruction in accordance with the prior art.

FIG. 13 is a flow chart 400 showing the operation of the load base register user instruction 402, in accordance with the prior art. The instruction is fetched by element 404 in the usual fashion. The instruction is decoded at element 406 to determine that the instruction is a load base register user instruction. Element 408 forms the operand address as explained above. The operand is fetched at element 410 and may be a virtual address having the format shown in FIG. 7.

Element 412 fetches the active base table entry corresponding to the base register to be modified. The L and BDI fields of the operand virtual address and the active base table virtual address are compared at element 414. If a match is not found, control is given to element 416 to perform a complete (i.e. slow) load of the selected base register. If a match is found, element 418 computes the new base register entry as explained above and loads the 52 bit address into the selected base register. The instruction is completed at element 420.

Figure 14:
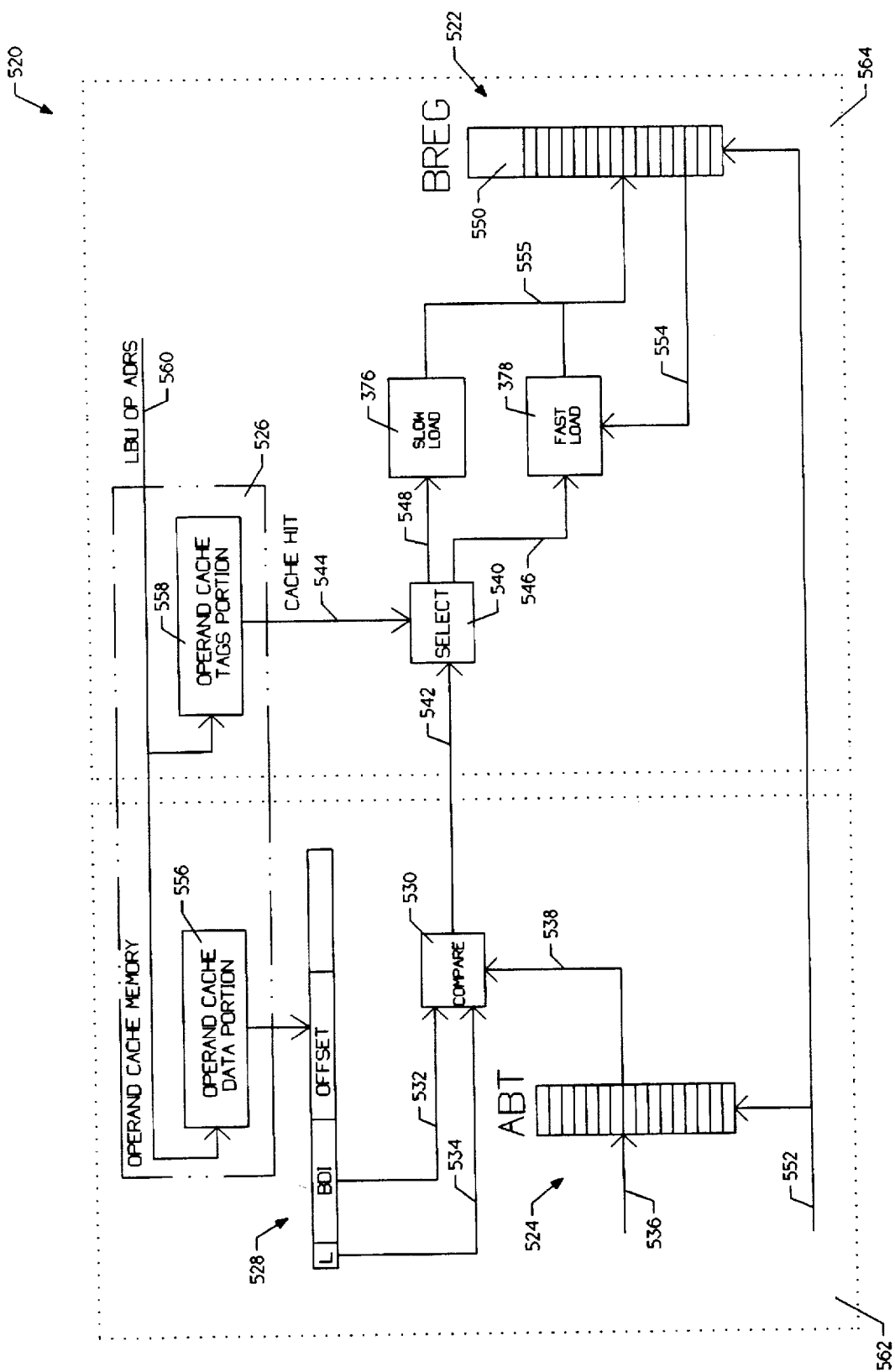
FIG. 14 is a schematic diagram showing how the decision is made to employ the fast or slow base register load in accordance with an exemplary embodiment of the present invention.

FIG. 14 is a schematic diagram showing how the decision is made to employ a fast or slow base register load in accordance with the present invention. The diagram is generally shown at 520 and includes an operand cache memory 526, an active base table 524, a base register 522, a compare block 530, a selection block 540, fast load logic 378 and slow load logic 376.

Although the description contained herein refers to a load base register user instruction, it is contemplated that the present invention is equally applicable to a load base register executive instruction. A load base register executive instruction is similar to a load base register user instruction, but the load base register executive instruction may load a separate set of executive base registers, which are only available to executive programs. The load base register user instructions typically cannot access these executive base registers. Despite this distinction, it is contemplated that the present invention may provide the same advantages to the load base register executive instruction, as described herein.

In accordance with the present invention, a load base register user instruction may request an operand from operand cache 526 via interface 560. Operand cache memory 526 may store a number of words wherein a predefined number of bit positions within each of the number of words may correspond to a virtual address having L,BDI fields. That is, predetermined operands within operand cache memory 526 may comprise a virtual address having a level (L) field, a bank descriptor index (BDI) field, and an offset field, as shown at 528. It is contemplated that the load base register user instruction may read the requested operand from the operand address location, regardless of whether the requested operand is actually present in operand cache 526, and provide the result to compare block 530 via interfaces 532 and 534.

Active base table 524 may be accessed using the designation of the base register to be modified supplied by interface 536. In a preferred embodiment, as the new virtual address is entered into the appropriate location of active base table 524, the previous contents may be supplied to compare block 530 via interface 538. Compare block 530 may then unconditionally compare the predefined number of bit positions that corresponds to the L,BDI fields within the requested operand to the previous L,BDI fields provided by active base table 524. This compare may occur regardless of whether a cache hit is detected by operand cache 526. The result of the compare is provided from compare block 530 to selection block 540 via interface 542.

As indicated above with reference to FIG. 3, operand cache 526 may determine whether a cache hit is detected during the above referenced operand read and compare, thereby indicating if the corresponding operand is a valid operand. The cache hit signal may be provide to selection block 540 via interface 544. Selection block 540 may determine whether the L,BDI fields of the requested operand match the previous L,BDI fields, and if a cache hit is detected by the operand cache. If both of these conditions are met, selection block 540 may select fast load logic 378 via interface 546. If either of these conditions are not met, selection block 540 may select slow load logic 376 via interface 548.

As indicated with reference to FIG. 12, fast load logic 378 may compute the new value to be stored within the appropriate base register. This value may be conveniently determined in several ways. In a first approach, the bank descriptor (i.e. absolute address for the initial location of the bank) may be saved from the previous loading of the base register. This requires sufficient random access storage to store the appropriate bank descriptors that corresponds to the current values stored in each of the base registers. This may save the time needed to access the corresponding bank descriptor table. In the exemplary embodiment, additional storage to store the bank descriptor indices is provided in base register 522, as shown at 550. Accordingly, the new offset may be added to the previous bank descriptor with the sum loaded into the corresponding base register 522.

Alternatively, fast load logic 378 may subtract the previous offset from the future offset. This difference may then be added to the current absolute address of the base register 522, via cable 380. In support thereof, it is contemplated that the current absolute address may be provided to fast load logic 378 via interface 554. Further, the appropriate base register may be selected via interface 552. For either approach, no further accesses to the bank descriptor tables are required. Further, no further computations are required resulting in a substantial performance enhancement.

Slow load logic 376 discards the previous virtual address and performs the loading of the selected base register in accordance with the previous description (see FIG. 11). With either slow load or fast load, the relative limits may be set.

It is contemplated that operand cache 526 may include a data portion 556 and a cache tags portion 558. Data portion 556 may provide the requested operand independent of whether cache tags portion 558 determines if a cache hit is detected. In this configuration, data portion 556 may be provided on a first substrate 562 and cache tags portion 558 may be provided on a second substrate 564. That is, data portion 556 may be located adjacent active base table 524 and cache tags portion 558 may be located adjacent base register 522. By partitioning the operand cache 526 in this manner, the number of signal paths that extend between the first and second substrate may be minimized.

In view of the above, it is readily apparent that if the requested operand does not reside in data portion 556, a garbage L,BDI field may be provided to compare block 530 via interfaces 532 and 534. The garbage L,BDI field may then be compared to the previous L,BDI fields via compare block 530, and the result may be provided to selection block 540 via interface 530. This is acceptable because cache tags portion 558 provides a cache hit signal to selection block 540 via interface 544, which prevents the garbage L,BDI field from triggering the fast load algorithm if a cache hit is not detected. This approach may improve the parallel nature of a base register load, and may decrease the number of signal traces extending between logic elements, thereby increasing the performance and efficiency of the system. It is expected that the present invention may increase overall system performance by as much as 4–5%.

In another exemplary embodiment of the present invention, it is contemplated that if the requested operand is not resident in the cache memory 526, and a cache hit signal is not detected, the system may delay compare block 530 until the requested operand is loaded from second level memory 88 or main memory 24 (see FIG. 3) to operand cache memory 526. Thereafter, compare block 530 may unconditionally compare the predefined number of bit positions that corresponds to the L,BDI fields within the requested operand to the previous L,BDI fields provided by active base table 524, regardless of whether a cache hit is detected by operand cache 526. Of course, after the requested operand has been loaded into operand cache memory 526 from memory, operand cache memory 526 will always provide a cache hit signal. The operation of the remaining logic is as described above.

Figure 15:
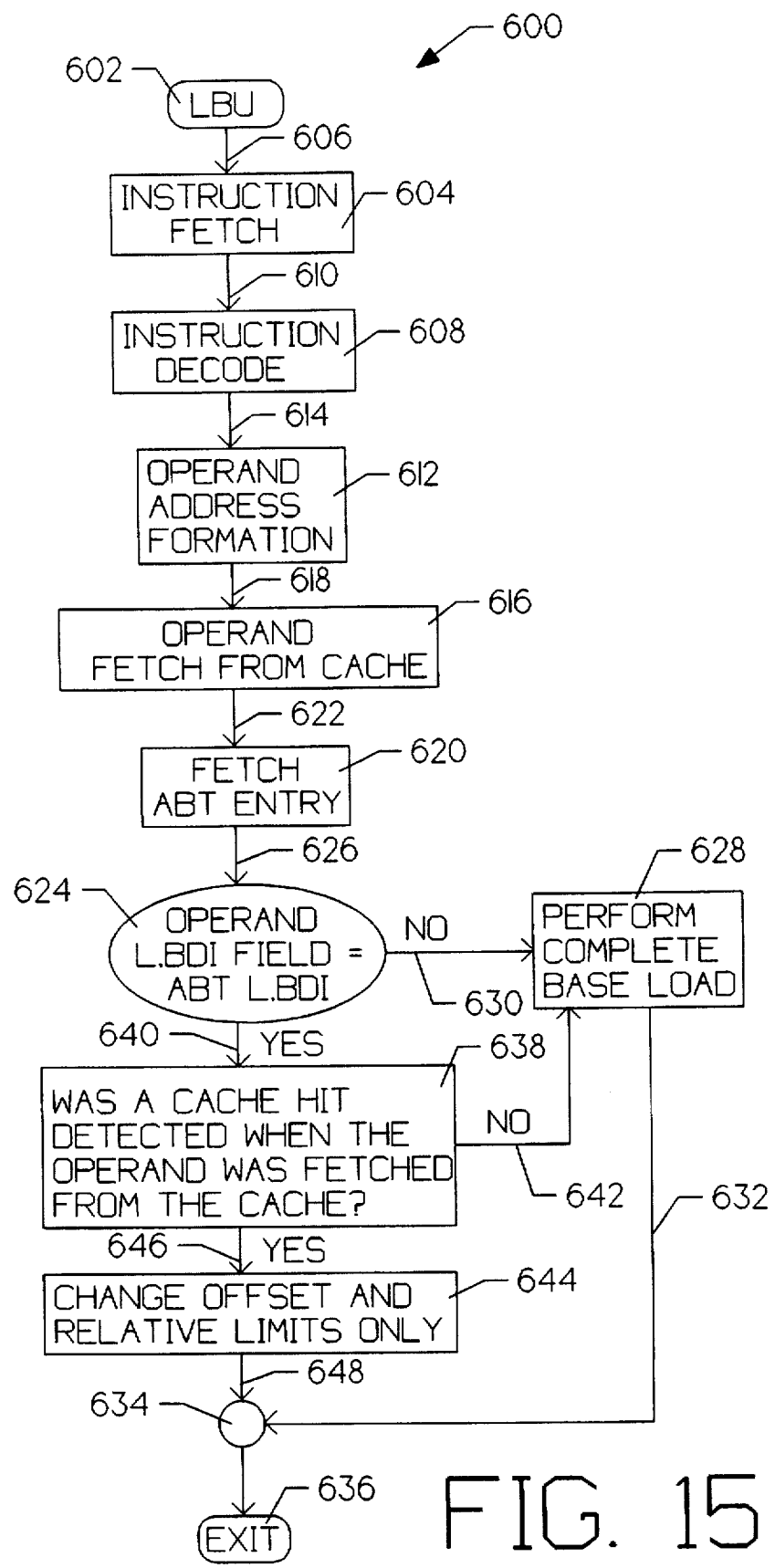
FIG. 15 is a flow diagram showing a first exemplary method of the present invention.

FIG. 15 is a flow diagram showing the basic operation of the load base register user instruction in accordance with the present invention. The diagram is generally shown at 600. The algorithm is entered at element 602, wherein control is passed to element 604 via interface 606. Element 604 fetches an Load Base Register User (LBU) instruction in the usual fashion. It is contemplated that element 604 may alternatively fetch a load base register executive instruction. Control is then passed to element 608 via interface 610. Element 608 decodes the instruction to determine if the instruction is a load base register user instruction. Control is then passed to element 612 via interface 614. Element 612 forms the operand as explained above. Control is then passed to element 616 via interface 618. Element 616 fetches the operand from an operand cache memory. As explained above, this operand consists of a virtual address having the format shown in FIG. 7.

Control is then passed to element 620 via interface 622. Element 620 fetches the active base table entry corresponding to the base register to be modified. Control is then passed to element 624 via interface 626. Element 624 compares the L and BDI fields of the operand virtual address and the active base table virtual address. If a match is not found, control is passed to element 628 via interface 630. Element 628 performs a complete base register load by computing the new base register entry as explained above. Control is then passed to element 634 via interface 632, wherein the algorithm is exited.

Referring back to element 624, if a match is found, control is passed to element 638 via interface 640. Element 638 determines whether a cache hit was detected when the operand was fetched from the cache memory. If a cache hit was not detected, control is passed to element 628 via interface 642. Element 628 performs a complete base load by computing the new base register entry as described above. Control is then passed to element 634 via interface 632, wherein the algorithm is exited.

Referring back to element 638, if a cache hit is detected, control is passed to element 644 via interface 646. Element 644 changes the offset and the relative limits only as explained above, and loads the resulting 52-bit address into the selected base register. Control is then passed to element 634 via interface 648, wherein the algorithm is exited.

Figure 16:
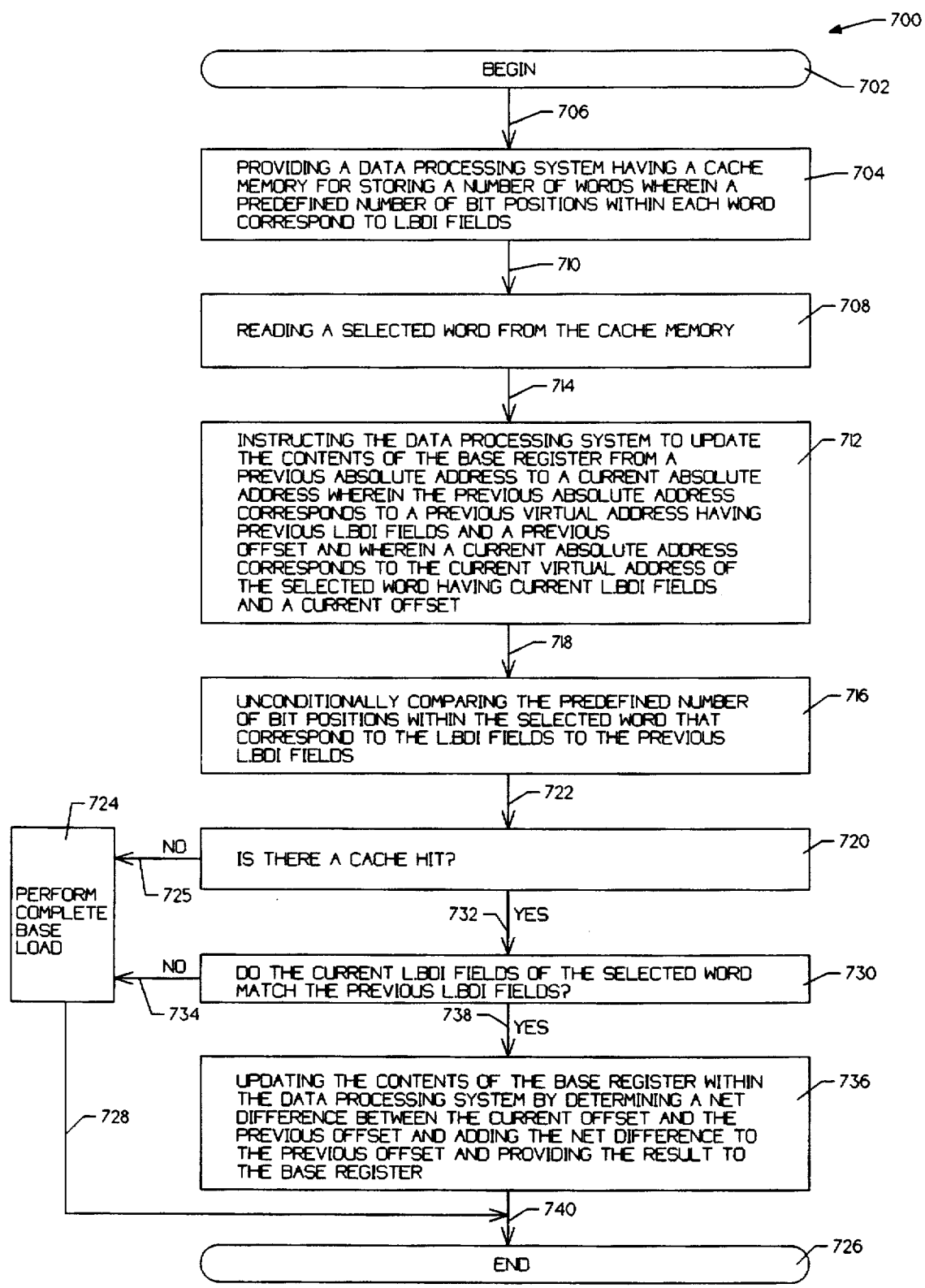
FIG. 16 is a flow diagram showing a second exemplary method of the present invention.

FIG. 16 is a flow diagram showing a second exemplary method of the present invention. The diagram is generally shown at 700. The algorithm is entered at element 702, wherein control is passed to element 704 via interface 706. Element 704 provides a data processing system having a cache memory for storing a number of words, wherein a predefined number of bit positions within each word correspond to L.BDI fields. Control is then passed to element 708 via interface 710. Element 708 reads a selected word from the cache memory. Control is then passed to element 712 via interface 714. Element 712 instructs the data processing system to update the contents of the base register from a previous absolute address to a current absolute address, wherein the previous absolute address corresponds to a previous virtual address having previous L.BDI fields and a previous offset, and wherein a current absolute address corresponds to the current virtual address of the selected word having current L.BDI fields and a current offset. Control is then passed to element 716 via interface 718.

Element 716 unconditionally compares the predefined number of bit positions within the selected word that correspond to the L.BDI fields to the previous L.BDI fields. This is done regardless of whether a cache hit is detected by the cache memory. Control is then passed to element 720 via interface 722. Element 720 determines whether a cache hit is detected. If a cache hit is not detected, control is passed to element 724 via interface 725. Element 724 performs a complete base load as described above. Control is then passed to element 726 via interface 728, wherein the algorithm is exited.

Referring back to element 720, if a cache hit is detected, control is passed to element 730 via interface 732. Element 730 determines whether the current L.BDI fields of the selected word match the previous L.BDI fields. If the current L.BDI fields of the selected word do not match the previous L.BDI fields, control is passed to element 724 via interface 734. Element 724 performs a complete base load. Control is then passed to element 726 via interface 728, wherein the algorithm is exited.

Referring back to element 730, if the current L.BDI fields of the selected word match the previous L.BDI fields, control is passed to element 736 via interface 738. Element 736 updates the contents of the base register within the data processing system by determining a net difference between the current offset and the previous offset and adding the net difference to the previous offset and providing the result to the base register. Control is then passed to element 726 via interface 740, wherein the algorithm is exited.

Figure 17:
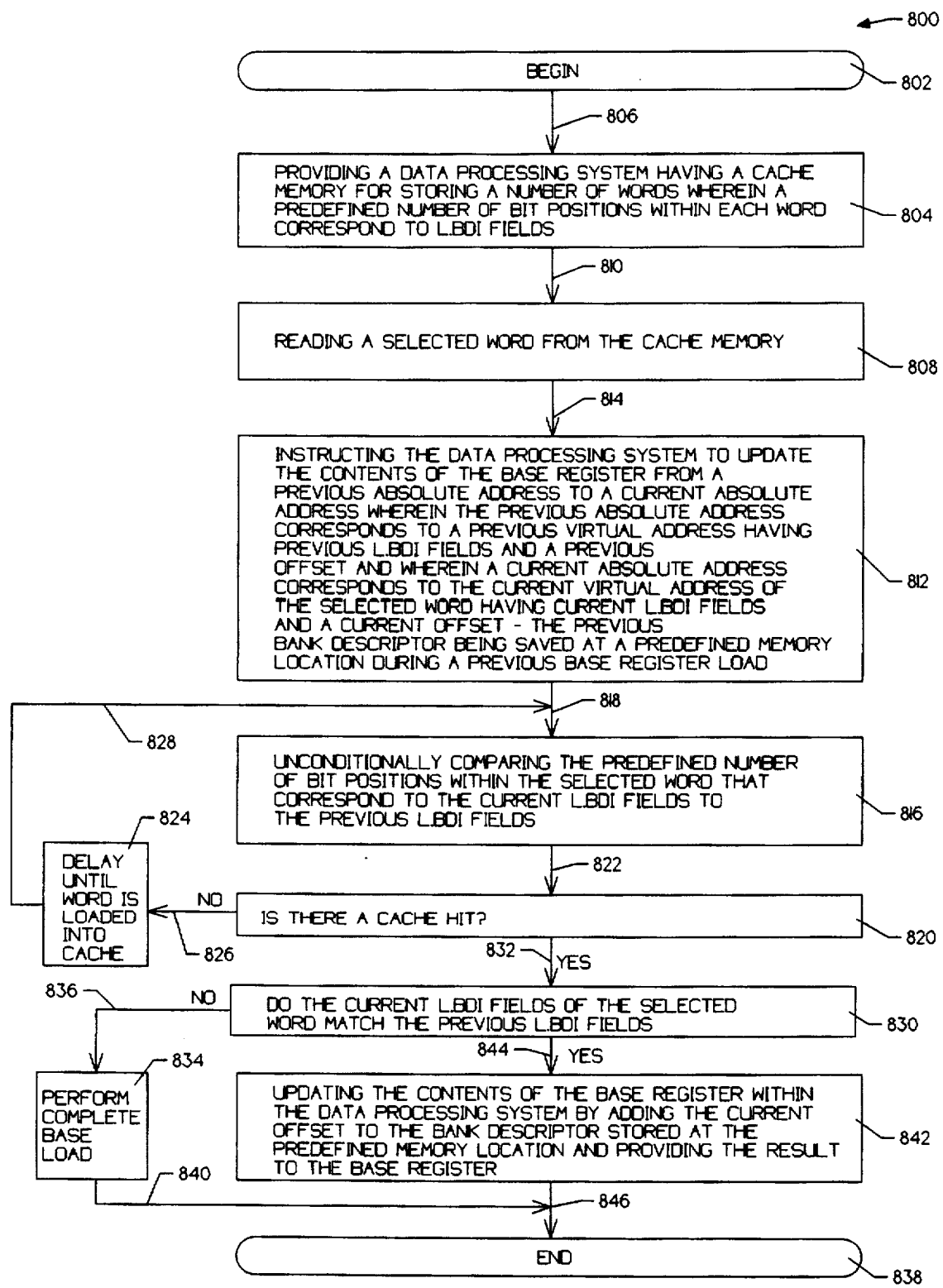
FIG. 17 is a flow diagram showing a third exemplary method of the present invention.

FIG. 17 is a flow diagram showing a third exemplary method of the present invention. The diagram is generally shown at 800. The algorithm is entered at element 802, wherein control is passed to element 804 via interface 806. Element 804 provides a data processing system having a cache memory for storing a number of words, wherein a predefined number of bit positions within each word correspond to a virtual address including an L and a BDI field. Control is then passed to element 808 via interface 810. Element 808 reads a selected word from the cache memory. Control is then passed to element 812 via interface 814. Element 812 instructs the data processing system to update the contents of the base register from a previous absolute address to a current absolute address, wherein the previous absolute address corresponds to a previous virtual address having previous L.BDI fields and a previous offset, and wherein a current absolute address corresponds to the current virtual address of the selected word having current L.BDI fields and a current offset. A previous bank descriptor entry corresponding to the present contents of the selected base register having been saved at a predefined memory location during a previous base register load. Control is then passed to element 816 via interface 818.

Element 816 unconditionally compares the predefined number of bit positions within the selected word that corresponds to the L.BDI fields to the previous L.BDI fields. Control is then passed to element 820 via interface 822. Element 820 determines whether a cache hit is detected by the cache memory. If a cache hit is not detected by the cache memory, control is passed to element 824 via interface 826. Element 824 delays the algorithm until the selected word is loaded from a main memory into the cache memory. Control is then passed back to element 816 via interface 828.

Referring back to element 820, if a cache hit is detected by the cache memory, control is passed to element 830 via interface 832. Element 830 determines whether the current L.BDI fields of the selected word match the previous L.BDI fields. If the current L.BDI fields of the selected word do not match the previous L.BDI fields, control is passed to element 834 via interface 836. Element 834 performs a complete base load as described above. Control is then passed to element 838 via interface 840, wherein the algorithm is exited.

Referring back to element 830, if the current L.BDI fields of the selected word do match the previous L.BDI fields, control is passed to element 842 via interface 844. Element 842 updates the contents of the base register within the data processing system by adding the current offset to the bank descriptor that is stored at the predefined memory location, and provides the results to the base register. Control is then passed to element 838 via interface 846, wherein the algorithm is exited.

It is contemplated that after each complete base register load 834, a corresponding bank descriptor from the corresponding bank descriptor table may be stored at a predefined memory location as described above.

Having thus described the preferred embodiments of the present invention, those of skill in the art will readily appreciate that the teachings found herein may be applied to yet other embodiments within the scope of the claims hereto attached.

What is claimed is:

1. A method for updating the contents of a base register within a data processing system wherein the data processing system includes a cache memory for storing a number words wherein a predefined number of bit positions within each of the number of words corresponds to a virtual address having an L (length) field, a BDI (base descriptor index) field, and an offset field; a load base register user instruction reading a selected word from the cache memory wherein the cache memory provides a cache hit if the selected word read by the load base register user instruction resides therein, thereby indicating if the selected word is a valid operand; the valid operand including a current virtual address having current L,BDI fields and a current offset field, the load base register user instruction instructing the data processing system to update the contents of the base register from a previous absolute address to a current absolute address wherein the previous absolute address corresponds to a previous virtual address having previous L,BDI fields and a previous offset and wherein the current absolute address corresponds to the current virtual address of the valid operand having the current L,BDI fields and the current offset, comprising:

a. unconditionally comparing the predefined number of bit positions within the selected word that correspond to the current L,BDI fields to the previous L,BDI fields, regardless of whether a cache hit is detected by the cache memory;
   b. determining if a cache hit is detected, thereby indicating that the corresponding operand is a valid operand; and
   c. updating the contents of the base register within the data processing system by determining a net difference between the current offset and the previous offset and adding the net difference to the previous offset and providing the result to the base register if said unconditionally comparing step (a) determines equality and if and only if said determining step (b) determines that a cache hit is detected.

2. A method according to claim 1 further comprising the step of:

a. delaying said updating step 1(c) from updating the contents of the base register until the selected word is provided to the cache memory from a main memory, if said determining step 1(b) determines that a cache hit is not detected.

3. A method according to claim 2 wherein the cache memory comprises a data portion and a tags portion.

4. A method according to claim 3 wherein the selected word is read from the data portion of the cache memory.

5. A method according to claim 4 wherein the determining step 1(b) searches the tags portion of the cache memory to determine if the cache hit is detected.

6. A method according to claim 5 wherein the data portion of the cache memory is located on a first substrate and the tags portion of the cache memory is located on a second substrate.

7. A method according to claim 6 wherein the comparing step 1(a) is performed on the first substrate.

8. A method according to claim 7 wherein the updating step 1(c) is performed on the second substrate.

9. A data processing system having a base register wherein the contents of the base register are updated, the data processing system including a cache memory for storing a number words wherein a predefined number of bit positions within each of the number of words corresponds to a virtual address having an L (length) field, a BDI (base descriptor index) field and an offset field; a load base register user instruction reading a selected word from the cache memory wherein the cache memory provides a cache hit if the selected word read by the load base register user instruction resides therein, thereby indicating if the selected word is a valid operand; a valid operand including a current virtual address having a current L field, a current BDI field and a current offset field, the load base register user instruction instructing the data processing system to update the contents of the base register from a previous absolute address to a current absolute address wherein the previous absolute address corresponds to a previous virtual address having a previous L field, a previous BDI field and a previous offset and wherein the current absolute address corresponds to the current virtual address of the valid operand having the current L field, the current BDI field and the current offset, comprising:

a. comparing means for unconditionally comparing the predefined number of bit positions within the selected word that correspond to the L,BDI fields to the previous L,BDI fields, regardless of whether a cache hit is detected;
   b. determining means coupled to the cache memory for determining if a cache hit is detected, thereby indicating that the corresponding operand is a valid operand; and
   c. updating means coupled to said comparing means and said determining means for updating the contents of the base register within the data processing system by determining a net difference between the current offset and the previous offset and adding the net difference to the previous offset and providing the result to the base register if said unconditionally comparing means (a) determines equality and if and only if said determining means (b) determines that a cache hit is detected.

10. A data processing system according to claim 9 further comprising:

a. delaying means for delaying said updating means 9(c) from updating the contents of the base register until the selected word is provided to the cache memory from a main memory, if said determining means 1(b) determines that a cache hit is not detected.

11. A data processing system according to claim 10 wherein the cache memory comprises a data portion and a tags portion.

12. A data processing system according to claim 11 wherein the selected word is read from the data portion of the cache memory.

13. A data processing system according to claim 12 wherein said determining means 9(b) searches the tags portion of the cache memory to determine if the cache hit is detected.

14. A data processing system according to claim 13 wherein the data portion of the cache memory is located on a first substrate and the tags portion of the cache memory is located on a second substrate.

15. A data processing system according to claim 14 wherein said comparing means 9(a) is located on the first substrate.

16. A data processing system according to claim 15 wherein said updating means 9(c) is located on the second substrate.

17. A data processing system having a base register wherein the contents of the base register are updated, the data processing system including a cache memory for storing a number words wherein a predefined number of bit positions within each of the number of words corresponds to a virtual address having an L (length) field, a BDI (base descriptor index) field and an offset field; a load base register user instruction reading a selected word from the cache memory wherein the cache memory provides a cache hit if the selected word read by the load base register user instruction resides therein, thereby indicating if the selected word is a valid operand; a valid operand including a current virtual address having a current L field, a current BDI field and a current offset field, the load base register user instruction instructing the data processing system to update the contents of the base register from a previous absolute address to a current absolute address wherein the previous absolute address corresponds to a previous virtual address having a previous L field, a previous BDI field and a previous offset and wherein the current absolute address corresponds to the current virtual address of the valid operand having the current L field, the current BDI field and the current offset, comprising:

a. comparing circuit for unconditionally comparing the predefined number of bit positions within the selected word that correspond to the current L,BDI fields to the previous L,BDI fields, regardless of whether a cache hit is detected;

b. determining circuit coupled to the cache memory for determining if a cache hit is detected, thereby indicating that the corresponding operand is a valid operand; and c. updating circuit coupled to said comparing circuit and said determining circuit for updating the contents of the base register within the data processing system by determining a net difference between the current offset and the previous offset and adding the net difference to the previous offset and providing the result to the base register if said unconditionally comparing circuit (a) determines equality and if and only if said determining circuit (b) determines that a cache hit is detected.

18. A method for updating the contents of a base register within a data processing system wherein the data processing system includes a cache memory for storing a number words wherein a predefined number of bit positions within each of the number of words corresponds to a virtual address having an L (length) field, a BDI (base descriptor index) field and an offset field; a load base register user instruction reading a selected word from the cache memory wherein the cache memory provides a cache hit if the selected word read by the load base register user instruction resides therein, thereby indicating if the selected word is a valid operand; a valid operand including a current virtual address having a current L field, a current BDI field and a current offset field, the load base register user instruction instructing the data processing system to update the contents of the base register from a previous absolute address to a current absolute address wherein the previous absolute address corresponds to a previous virtual address having a previous L field, a previous BDI field and a previous offset and wherein the current absolute address corresponds to the current virtual address of the valid operand having the current L field, the current bank descriptor index field and the current offset, the previous bank descriptor index field being saved at a predefined memory location within a memory during a previous base register load, comprising:

a. unconditionally comparing the predefined number of bit positions within the selected word that correspond to the L,BDI fields to the previous L,BDI fields, regardless of whether a cache hit is detected;

b. determining if a cache hit is detected, thereby indicating that the corresponding operand is a valid operand; and c. updating the contents of the base register within the data processing system by adding the current offset to the bank descriptor stored at the predefined memory location, if said unconditionally comparing step (a) determines equality and if and only if said determining step (b) determines that a cache hit is detected.

19. A method according to claim 18 further comprising the step of:

a. delaying said updating step 18(c) from updating the contents of the base register until the selected word is provided to the cache memory from a main memory, if said determining step 18(b) determines that a cache hit is not detected.

20. A method according to claim 19 wherein the cache memory comprises a data portion and a tags portion.

21. A method according to claim 20 wherein the selected word is read from the data portion of the cache memory.

22. A method according to claim 21 wherein the determining step 18(b) searches the tags portion of the cache memory if the cache hit is detected.

23. A data processing system having a cache memory for storing a number of operands and having an instruction processor for executing a program wherein a portion of a memory is allocated to the program, the portion of the memory being specified relative to a base absolute address wherein the base absolute address is determined from a base virtual address having an L (length) field, a BDI (base descriptor index) field and an offset, the base virtual address being assigned a value to identify the portion of the memory; for predetermined instructions of the program, the operand includes a virtual address wherein the virtual address has an L field, a BDI field and an offset field, a load base register user instruction reading a preselected operand from the cache memory, if located therein or otherwise from a main memory, wherein the operand includes a new virtual address wherein the new virtual address has a new L field, a new BDI field and a new offset field to identify a different segment within the memory corresponding to the program, the improvement for modifying the base register to utilize a new base absolute address comprising:

a. comparing means for unconditionally comparing the L,BDI fields of the operand read by the load base register user instruction, to the L,BDI fields of the base virtual address, regardless of whether the operand is in the cache memory;

b. determining means coupled to the cache memory for determining if the operand is in the cache memory; and c. modifying means coupled to said comparing means and further coupled to said determining means for modifying the base absolute address by an amount equal to the difference between the new offset of the new virtual address of the load base register user instruction and the offset of the base virtual address, if said comparing means determines equality and if and only if said determining means determines that the operand is in the cache memory.

* * * * *